(12) United States Patent
Davies

(10) Patent No.: US 11,243,321 B2
(45) Date of Patent: Feb. 8, 2022

(54) CORRECTING A DIGITAL SEISMIC IMAGE USING A FUNCTION OF SPEED OF SOUND IN WATER DERIVED FROM FIBER OPTIC SENSING

(71) Applicant: Chevron U.S.A. Inc., San Ramon, CA (US)

(72) Inventor: Kevin John Davies, Royston (GB)

(73) Assignee: CHEVRON U.S.A. INC., San Ramon, CA (US)

(*) Notice: Subject to any disclaimer, the term of this patent is extended or adjusted under 35 U.S.C. 154(b) by 915 days.

(21) Appl. No.: 15/971,829

(22) Filed: May 4, 2018

(65) Prior Publication Data
US 2019/0339408 A1    Nov. 7, 2019

(51) Int. Cl.
*G01V 1/36* (2006.01)
*G01V 1/22* (2006.01)
*G01V 1/38* (2006.01)

(52) U.S. Cl.
CPC .............. *G01V 1/362* (2013.01); *G01V 1/226* (2013.01); *G01V 1/3808* (2013.01); *G01V 2210/58* (2013.01)

(58) Field of Classification Search
None
See application file for complete search history.

(56) References Cited

U.S. PATENT DOCUMENTS

| 4,694,435 A | 9/1987 | Magneville |
|---|---|---|
| 4,927,232 A | 5/1990 | Griffiths |
| 4,970,697 A | 11/1990 | Earley et al. |
| 5,113,377 A | 5/1992 | Johnson |
| 5,257,241 A | 10/1993 | Henderson et al. |
| 6,256,589 B1 | 7/2001 | Gallotti Guimaraes |
| 7,537,058 B2 | 5/2009 | Gullapalli et al. |

(Continued)

FOREIGN PATENT DOCUMENTS

| DE | 69304855 T2 | 2/1997 |
|---|---|---|
| EP | 2137553 A1 | 12/2009 |

(Continued)

OTHER PUBLICATIONS

Abukhamsin, Ahmed Yasin; "Inflow Profiling and Production Optimization in Smart Wells Using Distributed Acoustic and Temperature Measurements"; A Dissertation, (Jun. 2017), pp. i-xxii and pp. 1-40.

(Continued)

*Primary Examiner* — Hovhannes Baghdasaryan

(57) ABSTRACT

One embodiment includes receiving distributed acoustic sensing (DAS) data for responses associated with seismic excitations in an area of interest. The area of interest includes a sea surface, the water column, a seafloor, and a subseafloor. The seismic excitations are generated by at least one seismic source in the area of interest. The responses are detected by at least one fiber optic sensing apparatus configured for DAS that is in the water column, on the seafloor, in a wellbore drilled through the seafloor and into the subseafloor, or any combination thereof. The embodiment includes determining a function of speed of sound in water using the DAS data, and correcting a digital seismic image associated with the area of interest using the function of speed of sound in water to generate a corrected digital seismic image.

29 Claims, 12 Drawing Sheets

(56) References Cited

U.S. PATENT DOCUMENTS

| | | | |
|---|---|---|---|
| 7,812,203 | B2 | 10/2010 | Balczewski |
| 7,964,150 | B2 | 6/2011 | Balczewski |
| 8,201,626 | B2 | 6/2012 | Balczewski |
| 8,605,542 | B2 | 12/2013 | Coates et al. |
| 9,052,230 | B2 | 6/2015 | Kutlik et al. |
| 9,284,826 | B2 | 3/2016 | Campbell et al. |
| 9,777,563 | B2 | 10/2017 | Balczewski |
| 9,840,898 | B2 | 12/2017 | Kasevich et al. |
| 9,896,617 | B2 | 2/2018 | Dwarakanath et al. |
| 9,902,894 | B2 | 2/2018 | Dwarakanath et al. |
| 9,902,895 | B2 | 2/2018 | Dwarakanath et al. |
| 9,909,053 | B2 | 3/2018 | Dwarakanath et al. |
| 2008/0102000 | A1 | 5/2008 | Balczewski |
| 2009/0132183 | A1 | 5/2009 | Hartog et al. |
| 2012/0060615 | A1 | 3/2012 | Farhadiroushan et al. |
| 2012/0092960 | A1 | 4/2012 | Gaston et al. |
| 2014/0022530 | A1 | 1/2014 | Farhadiroushan et al. |
| 2014/0046599 | A1 | 2/2014 | Smith et al. |
| 2014/0112094 | A1 | 4/2014 | Fernihough |
| 2014/0126325 | A1* | 5/2014 | Farhadiroushan .... E21B 47/135 367/35 |
| 2014/0288909 | A1 | 9/2014 | Prestwood et al. |
| 2014/0376332 | A1 | 12/2014 | Vigneaux et al. |
| 2015/0071034 | A1 | 3/2015 | Wills et al. |
| 2016/0281456 | A1 | 9/2016 | Sims et al. |
| 2016/0281471 | A1 | 9/2016 | Buell et al. |
| 2016/0281494 | A1 | 9/2016 | Shirdel et al. |
| 2017/0058186 | A1 | 3/2017 | Oghena et al. |
| 2017/0307772 | A1 | 10/2017 | Jutila et al. |
| 2018/0031462 | A1 | 2/2018 | Dwarakanath et al. |
| 2018/0031734 | A1 | 2/2018 | Sarkar |
| 2018/0100939 | A1 | 4/2018 | Cocker et al. |

FOREIGN PATENT DOCUMENTS

| | | |
|---|---|---|
| EP | 2684077 | 6/2015 |
| FR | 2654220 | 5/1991 |
| GB | 2476449 | 6/2011 |
| WO | 2010/090660 | 8/2010 |
| WO | 2014/199300 | 12/2014 |
| WO | 2015/187149 | 12/2015 |
| WO | 2016/039928 | 3/2016 |
| WO | 2017/040903 | 3/2017 |
| WO | 2018/020205 | 2/2018 |

OTHER PUBLICATIONS

Abukhamsin, Ahmed Yasin; "Inflow Profiling and Production Optimization in Smart Wells Using Distributed Acoustic and Temperature Measurements"; A Dissertation, (Jun. 2017), pp. 41-105.

Abukhamsin, Ahmed Yasin; "Inflow Profiling and Production Optimization in Smart Wells Using Distributed Acoustic and Temperature Measurements"; A Dissertation, (Jun. 2017), pp. i-xxii and pp. 106-171.

Claerbout, Jon F.; "Synthesis of a Layered Medium from Its Acoustic Transmission Response"; Geophysics, vol. 33, No. 2, (Apr. 1968), pp. 264-269.

Dwarakanath, Varadarajan, et al.; "Permeability Reduction Due to Use of Liquid Polymers and Development of Remediation Options"; SPE-179657-MS, (Apr. 2016), pp. 1-18.

Horne, Stephen Allan; "Determining Anisotropy for a Build Section of a Wellbore"; U.S. Appl. No. 15/926,700, filed Mar. 20, 2018.

Pratt, R.G., et al.; "Velocity Models from Wide-Angle Seismic Data by Wavefield inversion"; P138, 56th EAEG Meeting and Technical Exhibition, (Aug.-Jun. 1994), pp. 1-2.

Li, Y, et al.; "Analysis and Update with 3D DAS-VSP to Improve Borehole/Surface Seismic Images"; SEG Technical Program Abstracts, (Aug. 19, 2015), pp. 5285-5289.

Mateeva, A., et al.; "4D DAS VSP as a Tool for Frequent Seismic Monitoring in Deep Water"; The Leading Edge, (Dec. 2017), pp. 995-1000.

International Search Report, dated Sep. 10, 2019, during the prosecution of International Application No. PCT/IB2019/053521.

Written Opinion of the International Searching Authority, dated Sep. 10, 2019, during the prosecution of International Application No. PCT/IB2019/053521.

Duquet, Bertrand, et al.; "Filtering Coherent Noise During Prestack Depth Migration"; (1999), Geophysics, vol. 64, No. 4, pp. 1054-1066.

Duquet, Bertrand, et al.; "Kirchhoff Modeling, Inversion for Reflectivity, and Subsurface Illumination"; (2000), Geophysics, vol. 65, No. 4, pp. 1195-1209.

Nemeth, T., et al.; "3-D VSP Migration Imaging with Constraints In Lost-Hills, California"; (2000), Society of Exploration Geophysicists, SEG Technical Program Expanded Abstracts, 4 pages.

Stolk, Christiaan C., et al.; "Kinematic Artifacts in Prestack Depth Migration"; (2004), Geophysics, vol. 69, No. 2, pp. 562-575.

Yu, Jianhua, et al.; "Enhancing Illumination Coverage of VSP Data by Crosscorrelogram Migration"; (2004), SEG International Exposition and 74th Annual Meeting, 4 pages.

International Search Report, dated Jan. 15, 2018, during the prosecution of International Application No. PCT/US2017/055272.

Written Opinion of the International Searching Authority, dated Jan. 15, 2018, during the prosecution of International Application No. PCT/US2017/055272.

* cited by examiner

400 receiving distributed acoustic sensing data for responses associated with seismic excitations in an area of interest, wherein the area of interest includes a sea surface, a water column under the sea surface, a seafloor under the water column, and a subseafloor under the seafloor, wherein the seismic excitations are generated by at least one seismic source in the area of interest, and wherein the responses are detected by at least one fiber optic sensing apparatus configured for distributed acoustic sensing that is in the water column, on the seafloor, in a wellbore drilled through the seafloor and into the subseafloor, or any combination thereof 405 determining a function of speed of sound in water using the distributed acoustic sensing data 410 correcting a digital seismic image associated with the area of interest using the function of speed of sound in water to generate a corrected digital seismic image 415 generating a visual output that presents the function of speed of sound in water, the corrected digital seismic image, or any combination thereof for viewing by one or more users 420

FIG. 4

500 using at least one seismic source in an area of interest to generate seismic excitations in the area of interest, wherein the area of interest includes a sea surface, a water column under the sea surface, a seafloor under the water column, and a subseafloor under the seafloor 505 installing the at least one seismic source in the area of interest 510 using at least one fiber optic sensing apparatus configured for distributed acoustic sensing that is in the water column, on the seafloor, in a wellbore drilled through the seafloor and into the subseafloor, or any combination thereof to detect responses associated with the seismic excitations 515 installing the at least one fiber optic sensing apparatus in the water column, on the seafloor, in the wellbore drilled through the seafloor and into the subseafloor, or any combination thereof 520 receiving, at a computing system, distributed acoustic sensing data for the responses associated with the seismic excitations 525 determining, at the computing system, a function of speed of sound in water using the distributed acoustic sensing data 530 correcting, at the computing system, a digital seismic image associated with the area of interest using the function of speed of sound in water to generate a corrected digital seismic image 535 generating, at the computing system, a visual output that presents the function of speed of sound in water, the corrected digital seismic image, or any combination thereof for viewing by one or more users 540

FIG. 5

CORRECTING A DIGITAL SEISMIC IMAGE USING A FUNCTION OF SPEED OF SOUND IN WATER DERIVED FROM FIBER OPTIC SENSING

CROSS REFERENCES TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for seismic imaging of the subsurface and subsurface reservoirs and, in particular, using fiber optic sensing for the purpose of seismic imaging.

BACKGROUND

Seismic exploration involves surveying subterranean geological media for hydrocarbon deposits. An active survey typically involves deploying seismic sources and seismic sensors at predetermined locations. The seismic sources generate seismic waves, which propagate into the geological medium creating pressure changes and vibrations. Variations in physical properties of the geological medium change the properties of the seismic waves, such as their direction of propagation and other properties. The two main types of seismic waves are P waves (also referred to as compressional waves) and S waves (also referred to as shear waves). P waves relate to pressure and pass through liquids and solids. S waves relate to shear and pass through solids. P waves typically travel faster than S waves.

In addition to active surveys, passive surveys make use of naturally occurring and ambient seismic sources. For example, ambient seismic sources, such as ocean waves, passing ships, etc., may generate seismic waves that travel through the geological medium. In the case of passive surveys, seismic data may be recorded for days or months.

Portions of the seismic waves reach the seismic sensors. Some seismic sensors are sensitive to pressure changes (e.g., hydrophones), others to particle motion (e.g., geophones), and industrial surveys may deploy one type of sensor or both. Some methods use fiber optic point sensors and/or fiber optic cables as seismic sensors. In response to the detected seismic waves, the seismic sensors generate corresponding electrical signals, known as traces, and record them in storage media as seismic data. The seismic data will include a plurality of "shots" (individual instances of the seismic source being activated), each of which are associated with a plurality of traces recorded at the plurality of seismic sensors.

The seismic data is processed to create seismic images that can be interpreted to identify subsurface geologic features including hydrocarbon reservoirs. The processing is dependent on the survey design, the quality of the seismic data, and the complexity of the subsurface. The processing may include data conditioning methods (e.g., deghosting, noise attenuation, spectral enhancement, etc.), velocity estimation (e.g., semblance analysis, etc.), and seismic imaging (e.g., time migration, depth migration, reverse time migration, etc.). The seismic images that are produced are a representation of the physical subsurface and can be used to identify hydrocarbon reservoirs. For example, the seismic images may be used to control well drilling in order to drill wellbores that will produce hydrocarbons from the hydrocarbon reservoirs.

The ability to define, at high granularity, the location of rock and fluid property changes in the subsurface is crucial to our ability to make the most appropriate decisions for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

Thus, there exists a need for improved seismic imaging that may aid in identifying and producing hydrocarbon reservoirs.

SUMMARY

Embodiments of correcting a digital seismic image are provided herein. In one aspect, provided herein is an embodiment of a method of correcting a digital seismic image, the method comprising receiving distributed acoustic sensing data for responses associated with seismic excitations in an area of interest. The area of interest includes a sea surface, a water column under the sea surface, a seafloor under the water column, and a subseafloor under the seafloor. The seismic excitations are generated by at least one seismic source in the area of interest. The responses are detected by at least one fiber optic sensing apparatus configured for distributed acoustic sensing that is in the water column, on the seafloor, in a wellbore drilled through the seafloor and into the subseafloor, or any combination thereof. The method also includes determining a function of speed of sound in water using the distributed acoustic sensing data. The method also includes correcting a digital seismic image associated with the area of interest using the function of speed of sound in water to generate a corrected digital seismic image.

In one aspect, provided herein is an embodiment of a system, the system comprising a processor and a memory operatively connected to the processor, the memory storing instructions that, when executed by the processor, cause the processor to a method of correcting a digital seismic image. The method comprises receiving distributed acoustic sensing data for responses associated with seismic excitations in an area of interest. The area of interest includes a sea surface, a water column under the sea surface, a seafloor under the water column, and a subseafloor under the seafloor. The seismic excitations are generated by at least one seismic source in the area of interest. The responses are detected by at least one fiber optic sensing apparatus configured for distributed acoustic sensing that is in the water column, on the seafloor, in a wellbore drilled through the seafloor and into the subseafloor, or any combination thereof. The method also includes determining a function of speed of sound in water using the distributed acoustic sensing data. The method also includes correcting a digital seismic image associated with the area of interest using the function of speed of sound in water to generate a corrected digital seismic image.

In one aspect, provided herein is an embodiment of a method of correcting a digital seismic image, the method comprising using at least one seismic source in an area of interest to generate seismic excitations in the area of interest. The area of interest includes a sea surface, a water column under the sea surface, a seafloor under the water column, and a subseafloor under the seafloor. The method also includes using at least one fiber optic sensing apparatus configured for distributed acoustic sensing that is in the water column, on the seafloor, in a wellbore drilled through the seafloor and into the subseafloor, or any combination thereof to detect responses associated with the seismic excitations. The method also includes receiving, at a computing system, distributed acoustic sensing data for the responses associated with the seismic excitations. The method also includes determining, at the computing system, a function of speed of sound in water using the distributed acoustic sensing data. The method also includes correcting, at the computing system, a digital seismic image associated with the area of interest using the function of speed of sound in water to generate a corrected digital seismic image.

DESCRIPTION OF THE DRAWINGS

FIG. 4 is a flowchart that illustrates one embodiment of a method of correcting a digital seismic image.

FIG. 5 is a flowchart that illustrates another embodiment of a method of correcting a digital seismic image.

Figure 1A:
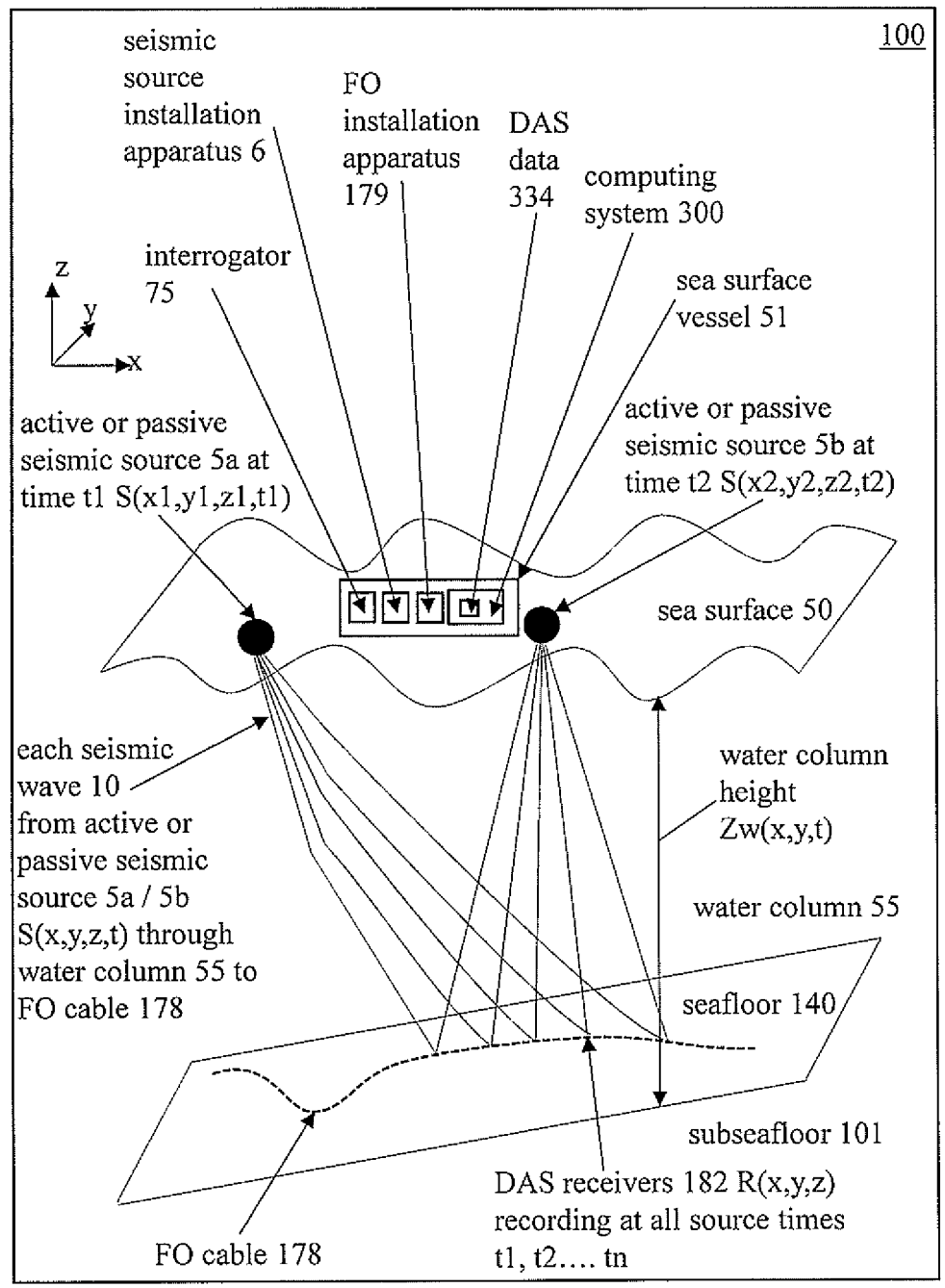
FIG. 1A-1C illustrate embodiments of a system for correcting a digital seismic image, including at least one fiber optic sensing apparatus configured for distributed acoustic sensing (DAS) in accordance with the disclosure.

Reference will now be made in detail to various embodiments, where like reference numerals designate corresponding parts throughout the several views. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

DETAILED DESCRIPTION

TERMINOLOGY: The following terms will be used throughout the specification and will have the following meanings unless otherwise indicated.

"Subsurface" refers to practically anything under a surface, such as under a sea surface, under a terrestrial surface (land), etc. The subsurface may include faults, fractures, overburdens, underburdens, salts, salt welds, rocks, sands, sediments, pore space, etc. The subsurface may be onshore, offshore (e.g., shallow water or deep water), etc. Indeed, it should be appreciated that the term "subsurface," as used herein, may include practically any geologic points or volume(s) of interest (such as a survey area).

Furthermore, the subsurface may include hydrocarbons, such as liquid hydrocarbons (also known as oil or petroleum), gas hydrocarbons (e.g., natural gas), a combination of liquid hydrocarbons and gas hydrocarbons, etc. One measure of the heaviness or lightness of a liquid hydrocarbon is American Petroleum Institute (API) gravity. According to this scale, light crude oil is defined as having an API gravity greater than 31.1° API (less than 870 kg/m3), medium oil is defined as having an API gravity between 22.3° API and 31.1° API (870 to 920 kg/m3), heavy crude oil is defined as having an API gravity between 10.0° API and 22.3° API (920 to 1000 kg/m3), and extra heavy oil is defined with API gravity below 10.0° API (greater than 1000 kg/m3). Light crude oil, medium oil, heavy crude oil, and extra heavy oil are examples of hydrocarbons. Thus, examples of hydrocarbons are many, and may include, conventional oil, heavy oil, natural gas, kerogen, bitumen, clathrates (or hydrates), etc.

The hydrocarbons may be recovered from the entire subsurface or from a portion of the subsurface. For example, the subsurface may be divided up into one or more hydrocarbon zones, and hydrocarbons can be recovered from each desired hydrocarbon zone. In some embodiments, one or more of hydrocarbon zones may even be shut in to increase hydrocarbon recovery from a hydrocarbon zone that is not shut in.

The hydrocarbons may be recovered from the subsurface using primary recovery (e.g., by relying on pressure to recover hydrocarbons), secondary recovery (e.g., by using water injection (also referred to as waterflooding) or natural gas injection to recover hydrocarbons), enhanced oil recovery (EOR), or any combination thereof. The term "enhanced oil recovery" refers to techniques for increasing the amount of hydrocarbons that may be extracted from the subsurface. Enhanced oil recovery may also be referred to as improved oil recovery or tertiary oil recovery.

EOR processes include, for example: (a) miscible gas injection (which includes, for example, carbon dioxide flooding), (b) chemical injection (sometimes referred to as chemical enhanced oil recovery (CEOR), and which includes, for example, polymer flooding, alkaline flooding, surfactant flooding, conformance control, as well as combinations thereof such as alkaline-polymer flooding, surfactant-polymer flooding, or alkaline-surfactant-polymer flooding), (c) microbial injection, (d) thermal recovery (which includes, for example, cyclic steam and steam flooding), or any combination thereof.

A CEOR process can include practically any flooding involving polymer, such as, but not limited to, a polymer (P) flooding process, an alkaline-polymer (AP) flooding process, a surfactant-polymer (SP) flooding process, an alkaline-surfactant-polymer (ASP) flooding process, or any combination thereof. The term "polymer" refers to practically any polymer that may be injected into a subsurface reservoir. For example, the polymer can be initially provided as a powder that is mixed on-site by at least one mixer, or the polymer can be initially provided in a partial-strength solution, such as gel, emulsion, or other fluid that is made up partly of polymer in a solute such as water or a brine.

Regarding the polymer, a powder polymer may be selected or tailored according to the characteristics of the subsurface reservoir such as permeability, temperature, and salinity. Examples of suitable powder polymers include biopolymers such as polysaccharides. For example, polysaccharides can be xanthan gum, scleroglucan, guar gum, schizophyllan, any derivative thereof (e.g., such as a modified chain), or any combination thereof. Examples of suitable powder synthetic polymers include polyacrylamides. Examples of suitable powder polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the powder synthetic polymer comprises polyacrylic acid (PAA). In one embodiment, the powder synthetic polymer comprises polyvinyl alcohol (PVA). Copolymers may be made of any combination or mixture above, for example, a combination of NVP and ATBS. Thus, examples of suitable powder polymers include biopolymers or synthetic polymers. Examples of suitable powder polymers can also include any mixture of these powder polymers (including any modifications of these powder polymers).

Examples of polymers are discussed in the following: U.S. Pat. Nos. 9,909,053, 9,896,617, 9,902,894, 9,902,895, US Patent Application Publication No. 2018/0031462, U.S. patent application Ser. No. 15/511,563 (also available as WO2017040903A1), each of which is incorporated by reference in its entirety. More examples of polymers may be found in Dwarakanath et al., "Permeability Reduction Due to use of Liquid Polymers and Development of Remediation Options," SPE 179657, SPE IOR Symposium in Tulsa, 2016, which is incorporated by reference in its entirety.

An injection fluid can be mixed on-site to include the polymer, e.g., by mixing the polymer in the form of a powder, gel, emulsion, or liquid, with a solute such as water. As discussed hereinabove, the powder polymer may involve at least one additional mixing step and storage of the result in a tank (e.g., tank on the surface). The result from the tank is then combined with the solute to form the injection fluid. The injection fluid is injected into the wellbore through a wellhead of the wellbore using at least one pump. The physical equipment to be used in mixing and injecting is dependent on the polymer, the wellbore, the subsurface reservoir, etc., but for simplicity, the tank, the mixer, the wellhead, the pump, and other items related to mixing and injecting the injection fluid will just be referred to herein as "injection apparatus."

The hydrocarbons may also be recovered from the subsurface using radio frequency (RF) heating. For example, at least one radio frequency antenna may be utilized to increase the temperature of the oil and reduce the oil's viscosity. The oil can then be produced from the subsurface with an improved oil flow rate. Radio frequency may also be used in combination with at least one other recovery technique, such as steam flooding, as described in U.S. Pat. No. 9,284,826, which is incorporated by reference in its entirety.

The hydrocarbons may also be recovered from the subsurface using fracturing. For example, fracturing may include hydraulic fracturing, fracturing using electrodes such as described in U.S. Pat. No. 9,840,898, etc. Fracturing may also be used in combination with at least one other recovery technique. Fracturing may be used to recover hydrocarbons from new reservoirs. Fracturing may also be used to help recover hydrocarbons from mature fields, for example, by waterflooding or steamflooding the mature fields after fracturing the mature fields. Mature fields are broadly defined as hydrocarbon fields where production has already peaked and production is currently declining.

The subsurface, the hydrocarbons, or both may also include non-hydrocarbon items. For example, non-hydrocarbon items may include connate water, brine, tracers, items used in enhanced oil recovery (e.g., polymer and fluid used in a chemical enhanced oil recovery process), items from other types of treatments (e.g., gels used in conformance control), etc.

In short, each subsurface may have a variety of characteristics, such as petrophysical rock properties, reservoir fluid properties, reservoir conditions, or any combination thereof. For example, each subsurface may be associated with one or more of: temperature, porosity, permeability, water composition, mineralogy, hydrocarbon type, hydrocarbon quantity, reservoir location, pressure, etc. Indeed, those of ordinary skill in the art will appreciate that the characteristics are many, including, for example: tight gas, shale gas, tight oil, tight carbonate, diatomite, geothermal, coalbed methane, a methane hydrate containing subsurface, a mineral containing subsurface, a metal containing subsurface, a subsurface having a permeability in the range of 0.01 microdarcy to 10 millidarcy, a subsurface having a permeability in the range of 10 millidarcy to 40,000 millidarcy, etc. The term "subsurface" may be used synonymously with the term "reservoir" or "formation" or "subsurface reservoir". The terms "subsurface," "hydrocarbon," and the like are not limited to any description or configuration described herein.

"Wellbore" refers to a single hole for use in hydrocarbon recovery. For example, a wellbore may be a cylindrical hole drilled into the subsurface such that the wellbore is surrounded by the subsurface. The wellbore may also be perforated for fluidic communication with the subsurface. The wellbore may be used for injection in some embodiments. The wellbore may be used for production in some embodiments. The wellbore may be used for fracturing in some embodiments. The wellbore may be used for a single function, such as only injection, in some embodiments. The wellbore may be used for a plurality of functions, such as both injection and production in some embodiments. The use of the wellbore may also be changed, for example, a particular wellbore may be turned into an injection wellbore after a different previous use. Oftentimes, the hydrocarbons may be swept from a single injection wellbore towards at least one production wellbore and then up towards the surface. The wellbore may be drilled amongst existing wellbores as an infill wellbore. A plurality of wellbores (e.g., tens to hundreds of wellbores) are often used in a field to recover hydrocarbons.

The wellbore may include a plurality of components, such as, but not limited to, a casing, a liner, a tubing string, a heating element, a wellhead, a tree, a sensor, a packer, a screen, a gravel pack, etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the subsurface, producing a fluid from the subsurface, or any combination thereof. The casing may be cemented into the wellbore with the cement placed in the annulus between the subsurface and the outside of the casing. The tubing string and the liner are typically not cemented in the wellbore. The wellbore may also include any completion hardware that is not discussed separately. If the wellbore is drilled offshore, for example, the wellbore may include some of the previous components plus other components such as a riser, an umbilical, a subsea manifold, a subsea tree, remotely operated vehicle (ROV), etc.

The wellbore may have vertical, horizontal, or combination trajectories. For example, the wellbore may be a vertical wellbore, a horizontal wellbore, a multilateral wellbore, an inclined wellbore, a slanted wellbore, etc.

The wellbore may include a "build section." "Build section" refers to practically any section of a wellbore where the deviation is changing. As an example, the deviation is changing when the wellbore is curving. In a horizontal wellbore, the build section is the curved section between the vertical section of the horizontal wellbore and the horizontal section of the horizontal wellbore. Wellbores that are not horizontal wellbores may also include a build section. For example, inclined or slanted wellbores may each include a build section. In some embodiments, a build section may exist in a wellbore when there is a deviation in the order of at least one seismic wave. In short, a section of a wellbore where the wellbore's angle is changing may be referred to as a "build section". Of note, those of ordinary skill in the art will appreciate that the build section of the wellbore may also include the subsurface in the vicinity of the build section of the wellbore in some embodiments.

The wellbore may be drilled into the subsurface using practically any drilling technique and equipment known in the art, such as geosteering, directional drilling, etc. For example, drilling the wellbore may include using a tool such as a drilling tool. The drilling tool may include a drill bit and a drill string. Drilling fluid may be used while drilling. One or more tools may additionally be used while drilling or after drilling, such as measurement-while-drilling (MWD) tools, seismic-while-drilling (SWD) tools, wireline tools, logging-while-drilling (LWD) tools, or other downhole or reservoir tools. After drilling to a predetermined depth, the drill string and drill bit are removed, and then the casing, the tubing, etc. may be installed according to the design of the wellbore. The equipment to be used in drilling may depend on the wellbore design, the subsurface, the hydrocarbons, etc., but for simplicity, the drill bit, the drill string, and other items related to drilling will just be referred herein as "drilling apparatus."

Some embodiments of wellbores may also be found in U.S. Patent Application Publication No. 2014/0288909 and U.S. Patent Application Publication No. 2017/0058186, each of which is incorporated by reference in its entirety. The term "wellbore" may be used synonymously with the terms "borehole," "well," or "well bore." The term "wellbore" is not limited to any description or configuration described herein.

As used in this specification and the following claims, the term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software, or any combination thereof.

Unless defined otherwise, all technical and scientific terms used herein have the same meanings as commonly understood by one of skill in the art to which the disclosed invention belongs. All citations referred herein are expressly incorporated by reference.

OVERVIEW: Speed of sound in water variations, such as $Vw(x,y,z,t)$, due to temperature and salinity changes, and height of water column variations, such as $Zw(x,y,t)$, due to tide and atmospheric change, oftentime cause noise in 3D and 4D (time lapse) marine seismic images. For example, this may be the case when applied to Tow Streamer (TS), Ocean Bottom Sensor (OBS), and Distributive Acoustic Sensing (DAS). Acoustic ray paths from seismic source, such as $S(x,y,z,t)$, pass through the water column and are perturbed within and between seismic surveys through $Vw(x,y,z,t)$ and $Zw(x,y,t)$. Uncorrected variation in seismic travel time associated with $Vw(x,y,z,t)$ and $Zw(t)$ may lead to significant 3D and 4D noise, compromising the seismic image and interpretation. Of note, (x,y,z) represent three-dimensional space variables, (t) represents a time variable, Vw represents speed of sound in water, and Zw represents depth of water.

Furthermore, free surface multiples travel additional approximate integer multiples of two through the water column and are subject to variation in travel time due to $Vw(x,y,z,t)$ and $Zw(t)$. In seismic processing, free surface multiples are either treated as noise, or used as signal. For TS, OBS, and DAS, additional image aperture may be achieved through imaging with free surface multiple. Whether multiples are treated as signal or noise, appropriate correction for the effects of $Vw(x,y,z,t)$ and $Zw(t)$ should be performed.

Typical corrective solutions for $Vw(t)$ are derived through decomposition of seismic source to receiver direct arrival travel times (DA) and/or from separately measured Sound Velocity Profiles $Vw(z,t)$. Tide corrections for $Zw(t)$ are typically derived from separate surface or seabed mounted acoustic or pressure measuring instruments, or from theoretical predicted tide data. However, DA may be used to determine an average $Vw(t)$ for the full water column, but cannot be used to derive $Vw(x,y,z,t)$, without an extensive and expensive 3D, 4D source and receiver network measuring source to receiver ray paths at all locations and times during the active survey or surveys. SVP may be used to derive $Vw(x,y,z,t)$, however, such systems are expensive, and typically not deployed in sufficient sampling density to capture $Vw(x,y,z,t)$.

As such, embodiments of correcting a digital seismic image are provided herein. For example, these embodiments may be used to measure strain change for approximation of $Vw(x,y,z,t)$ and derivation of corrective solutions for application in marine seismic 3D, 4D imaging. In one aspect, provided herein is an embodiment of a method of correcting a digital seismic image, the method comprising receiving DAS data for responses associated with seismic excitations in an area of interest. The area of interest includes a sea surface, a water column under the sea surface, a seafloor under the water column, and a subseafloor under the seafloor. The seismic excitations are generated by at least one seismic source in the area of interest. The responses are detected by at least one fiber optic sensing apparatus configured for DAS that is in the water column, on the seafloor, in a wellbore drilled through the seafloor and into the subseafloor, or any combination thereof. The method also includes determining a function of speed of sound in water using the DAS data. The method also includes correcting a digital seismic image associated with the area of interest using the function of speed of sound in water to generate a corrected digital seismic image. Of note, the term sea surface is utilized for simplicity, but "sea surface" may refer to practically any aquatic surface. Similarly, the term "seafloor" may refer to "seabed" or practically any aquatic floor, and the term "subseafloor" may refer to "subseabed" or practically any area under the aquatic floor.

Advantageously, those of ordinary skill in the art will appreciate, for example, that the embodiments provided herein may be utilized to generate a more accurate digital seismic image (i.e., the corrected digital seismic image). The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults more accurately. As another example, assume that the more accurate digital seismic image indicates the presence of a hydrocarbon deposit, such as a clathrate (also referred to as hydrate) deposit. The more accurate digital seismic image may delineate more accurately the bounds of the clathrate deposit so that the clathrate deposit may be produced or avoided depending on the desired outcome.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Continuing with the clathrate deposit example, if the decision is made to produce the clathrate deposit indicated by the more accurate digital seismic image, those of ordinary skill in the art will appreciate that decisions about (a) where to drill one or more wellbores to produce the clathrate deposit, (b) how many wellbores to drill to produce the clathrate deposit, etc. may be made based on the more accurate digital seismic image. The more accurate digital seismic image may even be utilized to select the trajectory of each wellbore to be drilled. Moreover, if the delineation indicates a large clathrate deposit, then a higher number of wellbore locations may be selected and that higher number of wellbores may be drilled, as compared to delineation indicating a smaller clathrate deposit. If the decision is made to avoid the clathrate deposit indicated by the more accurate digital seismic image, those of ordinary skill in the art will appreciate that the bounds of the clathrate deposit may be used to make decisions about (a) where not to drill wellbores or where to drill wellbores so as to avoid the clathrate deposit, (b) how many wellbores to drill to avoid the clathrate deposit, etc.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. Continuing with the clathrate deposit example, a drilling tool may be steered to drill one or more wellbores to produce the clathrate deposit or steered to avoid the clathrate deposit depending on the desired outcome. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., clathrate deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. Continuing with the clathrate deposit example, a variety of casing, tubing, packers, heaters, sand screens, gravel packs, items for fines migration, etc. may be selected for each wellbore to be drilled based on the more accurate digital seismic image. Furthermore, one or more recovery techniques to produce the clathrate deposit may be selected based on the more accurate digital seismic image. Some recovery techniques and devices, amongst many options, that may be selected to produce the clathrate deposit are provided in the following: U.S. Pat. Nos. 9,777,563, 7,812,203, U.S. Patent App. Pub. No. 2008/0102000, U.S. Pat. Nos. 7,964,150, 8,201,626, and 7,537,058, all of which are incorporated by reference in their entireties.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

SYSTEM OVERVIEW: Provided herein are embodiments for correcting a digital seismic image. In some embodiments, seismic excitations are generated by at least one seismic source in an area of interest. The area of interest includes a sea surface, a water column under the sea surface, a seafloor under the water column, and a subseafloor under the seafloor. Responses are detected by at least one fiber optic sensing apparatus configured for DAS that is in the water column, on the seafloor, in a wellbore drilled through the seafloor and into the sub seafloor, or any combination thereof. DAS data for the responses associated with the seismic excitations in the area of interest is used for correcting the digital seismic image.

Seismic Source: A "seismic source" refers to practically anything that generates seismic excitations in the area of interest. The area of interest includes a sea surface, a water column under the sea surface, a seafloor under the water column, and a subseafloor under the seafloor. The seismic source may also be in the area of interest. For example, a seismic source may be a device in the area of interest that sends at least one seismic wave in the area of interest. Seismic waves are sound waves. The seismic source may be on the sea surface (e.g., deployed on a boat, pulled by a boat, etc.), in the water column under, in a wellbore drilled through the seafloor and into the subseafloor, etc.

The seismic source may be passive or active. For example, the passive seismic source may be an ocean wave, a passing ship, interfering seismic survey, environmental energy, etc. For example, the active seismic source may be an air gun, a marine vibrator, etc. Furthermore, the seismic source may be practically any seismic source that is compatible with a fiber optic sensing apparatus configured for DAS. The fiber optic sensing apparatus will be discussed further hereinbelow. The techniques and equipment to be used to install the seismic source, such as install an active seismic source, may depend on the kind of the seismic source, as well as the location where the seismic source is to be installed. For example, the equipment may include towlines, floats, etc., but for simplicity, the items related to installing the seismic source will just be referred herein as "seismic source installation apparatus."

In some embodiments, a plurality of seismic sources are utilized to generate seismic excitations in the area of interest. The plurality of seismic sources may be of the same type, or alternatively, the plurality of seismic sources may be a combination of different types of seismic sources.

Figure 1B:
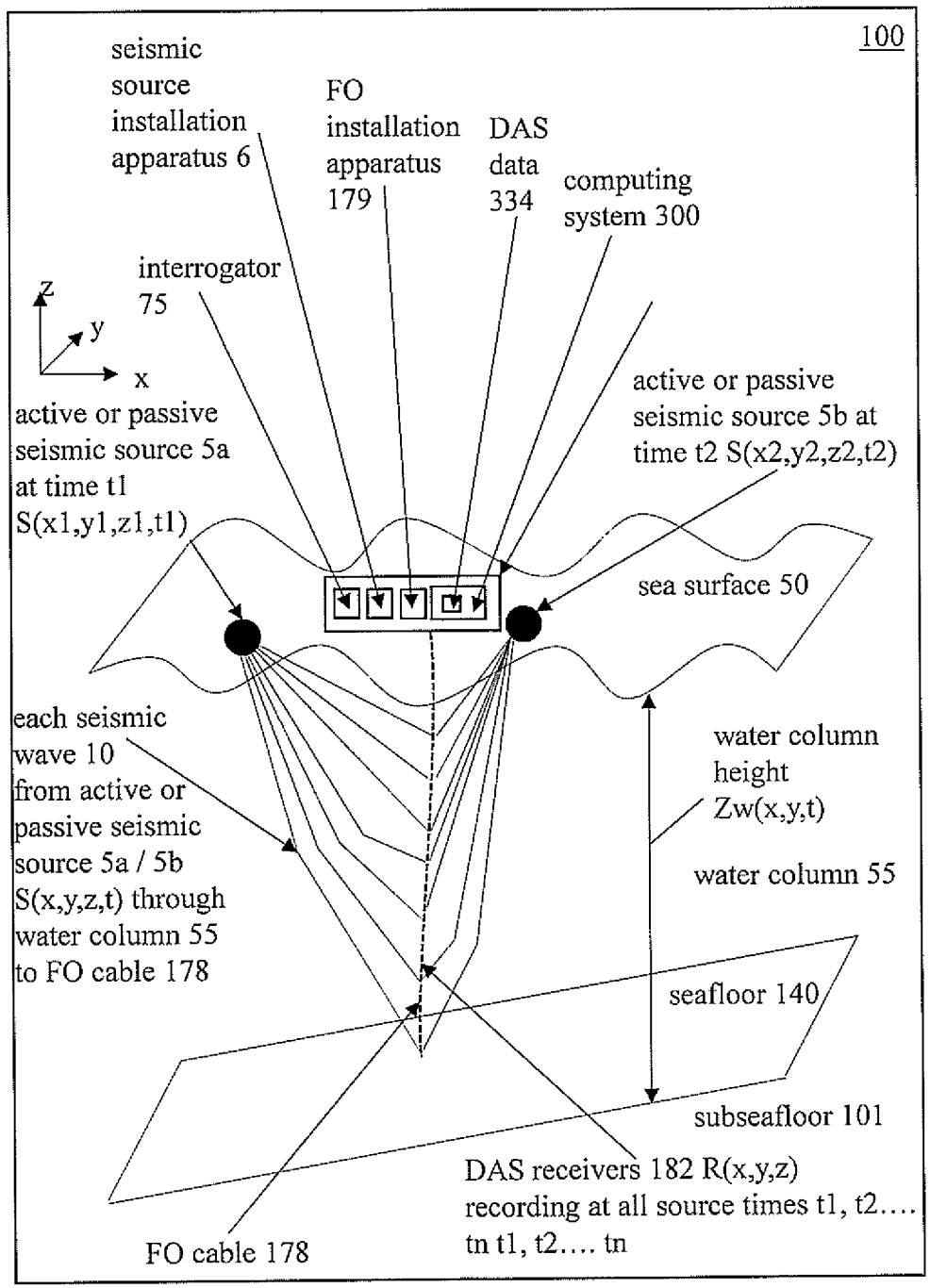
Figure 1C:
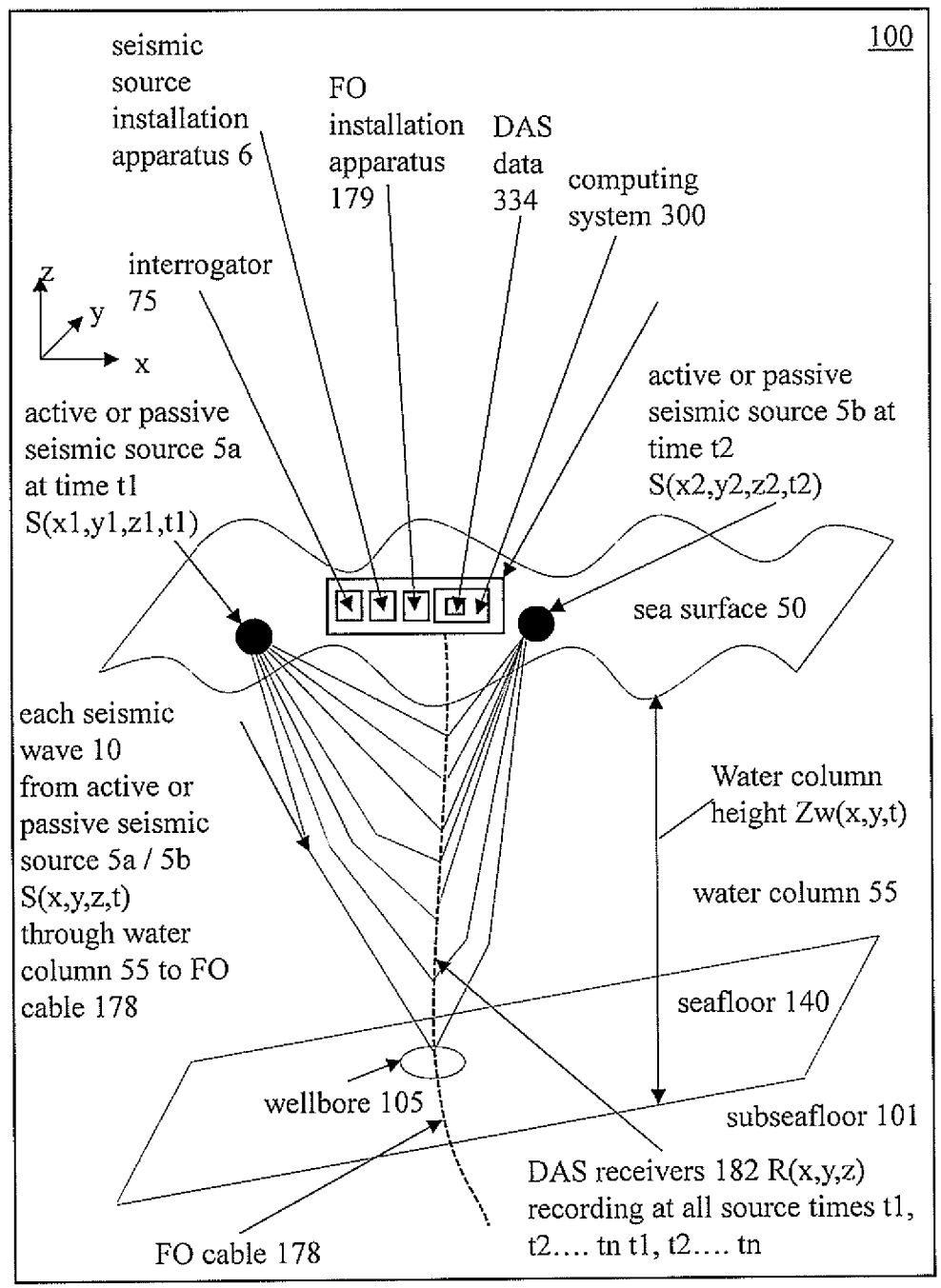

Turning to FIGS. 1A-1C, these figures provide various embodiments of a system for correcting a digital seismic image, including at least one seismic source and at least one fiber optic sensing apparatus configured for DAS in accordance with the disclosure. In these figures, the area of interest includes a sea surface 50, a water column 55 under the sea surface 50, a seafloor 140 under the water column 55, and a subseafloor 101 under the seafloor 140. A system 100 for correcting a digital seismic image includes at least one seismic source (e.g., a first seismic source 5a at time t1 and a second seismic source 5b at time t2), for example, on a sea surface vessel 51 on the sea surface 50. The sea surface vessel 51 may be a ship, a platform, a FPSO (Floating, Production, Storage, and Offloading vessel), Automated Surface Vehicle (AS), etc. Each seismic source may have corresponding x, y, z, t values (e.g., the first seismic source 5a has corresponding values S(x1, y1, z1, t1) and the second seismic source 5b has corresponding values S(x2, y2, z2, t2)). Each seismic source may be passive or active. A seismic source installation apparatus 6 on the sea surface vessel 51 may be utilized to install one or more seismic sources, such as active seismic sources. Each seismic source generates seismic excitations, such as at least one seismic wave, in the area of interest. For example, at least one seismic wave 10 may be generated by each of the seismic source 5a and the seismic source 5b. Responses to these seismic excitations are detected by at least one fiber optic sensing apparatus configured for DAS, such as a FO cable 178 (discussed further below).

Those of ordinary skill in the art will appreciate that some embodiments may have a different quantity (e.g., more than or less than) than the illustrated quantity of seismic sources, seismic excitations, fiber optic sensing apparatuses, or any combination thereof. Similarly, the seismic sources, the seismic excitations, the fiber optic sensing apparatuses may be in different locations, and the seismic excitations may have different angles than illustrated. Furthermore, the term "seismic source" may be used synonymously with the term "source." The term "seismic source" is not limited to any description or configuration described herein.

Seismic Sensor: A "seismic sensor" refers to practically anything that detects responses associated with seismic excitations in an area of interest. One embodiment of the seismic sensor is a fiber optic sensing apparatus configured for DAS. The fiber optic sensing apparatus configured for DAS may also be in the area of interest. The area of interest includes a sea surface, a water column under the sea surface, a seafloor under the water column, and a subseafloor under the seafloor. For example, the fiber optic sensing apparatus configured for DAS may be in the water column, on the seafloor, in a wellbore drilled through the seafloor and into the subseafloor, or any combination thereof.

At least one fiber optic sensing apparatus configured for DAS may detect responses associated with seismic excitations in the area of interest. DAS data for the responses may be used for determining a function of speed of sound in water to correct a digital seismic image associated with the area of interest and generate a corrected digital seismic image. The fiber optic sensing apparatus configured for DAS may also be further configured distributed pressure sensing (DPS) for determining changes in height of the water column. Correcting the digital seismic image may include using the changes in height of the water column.

In some embodiments, a plurality of the fiber optic sensing apparatuses configured for DAS may be utilized to detect responses to the seismic excitations. For example, two fiber optic sensing apparatuses configured for DAS may in be in the water column, on the seafloor, in the wellbore drilled through the seafloor and into the subseafloor, or any combination thereof. Alternatively, another embodiment may include at least one fiber optic sensing apparatus configured for DAS and at least one other seismic sensor (e.g., a hydrophone, a geophone, etc.).

One embodiment of the fiber optic sensing apparatus configured for DAS comprises a FO cable. It should be understood that the FO cable discussed herein is configured for DAS, even if the terminology "configured for DAS" is not utilized each time. One embodiment of the fiber optic sensing apparatus configured for DAS comprises a FO sensor (e.g., a FO point sensor). For example, the fiber optic sensing apparatus configured for DAS may include practically any arrangement of FO sensors that accomplish DAS or similar to DAS.

At least one FO cable may be in the water column, on the seafloor, in the wellbore drilled through the seafloor and into the subseafloor, or any combination thereof. A single FO cable or a plurality of FO cables may be in the water column, on the seafloor, in the wellbore drilled through the seafloor and into the subseafloor, or any combination thereof in accordance with this disclosure. For example, in one embodiment, the FO cable may be on the seafloor. In another embodiment, the FO cable may be in the water column. In another embodiment, the FO cable may be in the water column as well as in the wellbore drilled through the seafloor and into the subseafloor. In another embodiment, the FO cable may be on the seafloor as well as in the wellbore drilled through the seafloor and into the subseafloor. In another embodiment, the FO cable may even be in all three locations. In another embodiment, a first FO cable may be on the seafloor and a second FO cable may be in the water column (and optionally the second FO cable may also be in the wellbore drilled through the seafloor and into the subseafloor). In some embodiments, the FO cable may originate at the sea surface, such as from a sea surface vessel. For example, a FO cable entrenched in the seafloor may have a lead-in going back to a platform via a riser or J-tube. A discussion of fiber optics in a marine environment is provided in U.S. Patent App. Pub. No. 2018/0100939, which is incorporated by reference.

The FO cable detects responses associated with seismic excitations in the area of interest. The DAS data for the responses may be used for determining a function of speed of sound in water to correct a digital seismic image associated with the area of interest and generate a corrected digital seismic image. The FO cable may also be further configured for DPS for determining changes in height of the water column. Correcting the digital seismic image may include using the changes in height of the water column. In some embodiments, the FO cable may also be configured to perform distributed temperature sensing (DTS). Indeed, the FO cable may perform DAS, DPS, DTS, or any combination thereof depending on the embodiment. For example, a previously installed FO cable may already be configured for DAS (and optionally DPS and optionally DTS), and this previously installed FO cable may be utilized herein. Alternatively, a new FO cable configured for DAS (and optionally DPS and optionally DTS) may be installed. The techniques and equipment to be used to install the FO cable may depend on whether the FO cable is to be installed in a permanent, pumpable, or temporary manner, as well as the location where the FO cable is to be installed. For example, the equipment may include clamps, straps, reels, etc., but for simplicity, the items related to installing the FO cable will just be referred herein as "FO installation apparatus."

The FO cable may include one or more scatterers. The FO cable may include one or more diffractors. The FO cable may include one or more reflectors. The FO cable includes one or more optical fibers used for DAS. In one embodiment, an unmodified, substantially continuous length of standard optical fiber may be used, requiring little or no modification or preparation for use as a DAS optical fiber. The FO cable configured for DAS may optionally include one or more optical fibers for DPS and may optionally include one or more optical fibers for DTS. Thus, the FO cable includes at least one optical fiber that may be, but is not limited to: one or more optical fibers used for DAS, one or more optical fibers for DPS, one or more optical fibers used for DTS, or any combination thereof. The optical fibers may include multimode optical fibers, single mode optical fibers, etc.

Each DAS optical fiber of the FO cable may be optically interrogated by one or more input pulses to provide substantially continuous sensing of strain or vibrational activity along its length. An interrogator (e.g., at the sea surface or on the seafloor referred to as a "marinized interrogator") may be connected to the DAS optical fiber for the interrogation. The DAS optical fiber may be either single-mode or multimode. In some embodiments, the term "acoustic" may be taken to mean any type of mechanical vibration or pressure wave, including seismic waves and sounds from sub-Hertz to 20 KHz. Optical pulses are launched into the DAS optical fiber and the radiation backscattered from within the DAS optical fiber is detected and analyzed. Backscattering (e.g., Rayleigh backscattering) analysis is used to quantify vibration, seismic waves, sound, strain, etc. By analyzing the radiation backscattered within the DAS optical fiber, the DAS optical fiber can effectively be divided into a plurality of sensing portions or points which may be (but do not have to be) contiguous. Mechanical vibrations of the DAS optical fiber, for instance from seismic sources, cause a variation in the amount of backscatter (e.g., Rayleigh backscatter) from that portion. This variation can be detected and analyzed and used to give a measure of the acoustic spectrum intensity of disturbance of the DAS optical fiber at that portion. Besides the intensity (amplitude) and distance, other factors that can be measured include frequency, phase, duration, and signal evolution of the transients.

In short, the FO cable may be coupled to an apparatus, such as an interrogator. The interrogator may be on the sea surface (e.g., on a sea surface vessel) or under the sea surface (e.g., a "marinized interrogator" under the sea surface such as on the seafloor). The interrogator contains opto-electronic components. The interrogator provides light (e.g., laser light) into the FO cable and receives the backscatter energy from the FO cable. For example, one or more seismic sources causes strain, and the strain causes the backscatter energy from the FO cable. The interrogator also converts the backscatter energy into arrival times and generates DAS data that includes the arrival times.

The DAS data may be sent to at least one system, such as at least one computing system, for (1) storing of the DAS data, (2) processing of the DAS data, (d) determining a function of speed of sound in water using the DAS data, (4) correcting a digital seismic image associated with the area of interest using the function of speed of sound in water to a generate a corrected digital seismic image, etc. As an example, all of this functionality (1)-(4) may be performed at a first computing system on the sea surface, such as on a sea surface vessel. As another example, the DAS data may be sent from the interrogator to a first computing system on the sea surface, such as on the sea surface vessel. The DAS data may be sent from the first computing system to a second computing system on land for functionality (2)-(4). The DAS data may be stored at the first computing system, the second computing system, or both. As another example, the DAS data may be sent from the interrogator to a first computing system on the sea surface, such as on a sea surface vessel, for partial processing of the DAS data. The partially processed DAS data may be sent from the first computing system to a second computing system on land for functionality (2)-(4). The DAS data may be stored at the first computing system, the second computing system, or both. As another example, the DAS data may be sent from the interrogator to a first computing system on the sea surface, such as on a sea surface vessel, and the DAS data may be accessed by one or more users from a second computing system on land (e.g., a user logs on remotely). The functionality (2)-(4) is performed on the DAS data at the first computing system on the sea surface by the one or more users without sending the DAS data to the second computing system on land. The DAS data may also be partially processed at the first computing system on the sea surface before the one or more users on land accesses it. In some embodiments, the DAS data (before processing, during processing, or after processing) may be combined with other data (e.g., ground truth data, core data, etc.).

Those of ordinary skill in the art will appreciate that various modifications may be performed, for example, the functionality described for the interrogator may be divided among multiple components that are on the sea surface, under the sea surface, on land, or any combination thereof. The functionality described for the interrogator may use other components, for example, to aid in underwater optical communication, to aid communication from under the sea surface with the sea surface, etc. For example, additional elements may include marinized (i.e. designed to be submerged in a marine environment) junction boxes, a marinized data download system, wet mate connectors to allow cable splits for floating and/or weighted cables, etc. Use of an underwater optical communication system may also provide highest bandwidth data transfer over short range between a marinized data download device and a mobile underwater vehicle (ROV or AUV). Other modifications may include using high power light emitting diodes (LED) as the transmitter and a receiver, and using photo multiplexors to increase sensitivity, or alternately using focused underwater laser. There may also be additional subsea infrastructure with a FO junction box, an interrogator (e.g., marinized interrogator), or any combination thereof. A plurality of interrogators may be used in some embodiments. Furthermore, DAS, DTS, and DPS interrogators are different, and each of these may be used depending on the embodiment. The functionality described for the first computing system and/or the second computing system may be divided among multiple components that are on the sea surface, under the sea surface, on land, or any combination thereof. The functionality described for the first computing system and/or the second computing system may use other components.

Turning to the structure of the FO cable, the FO cable includes at least one optical fiber that may be surrounded by at least one protective layer to shield the at least one optical fiber against the environment. One embodiment of the FO cable comprises a capillary tubing (also referred to as capillary tube) to house the at least one optical fiber. The capillary tubing may be filled with a fluid, e.g., a hydrogen scavenging gel, an inert heat transfer fluid, or an inert gas. In one embodiment, the filling fluid is a gel designed to scavenge hydrogen and protect the at least one optical fiber from hydrogen darkening. The gel also helps to support the weight of the at least one optical fiber within the capillary tubing. In another embodiment, the capillary tubing is filled with an inert gas such as nitrogen to avoid exposure of the at least one optical fiber to water or hydrogen, thereby minimizing any hydrogen-induced darkening of the at least one optical fiber during oilfield operations. In one embodiment, a single capillary tubing is used, which contains a plurality of optical fibers. In another embodiment, multiple capillary tubings may be used, with each capillary tubing containing one or more optical fibers.

A variety of installation options may be utilized: permanent, pumpable, or temporary. With the pumpable option, two capillary tubings are used to enable pumping fluid to be pumped down the capillary tubing and returned to the surface. A turnaround sub with a U-tube geometry is used at the deepest wellbore placement to join the two capillary tubings and enable pumping. The viscous drag force of the pumped fluid on the at least one optical fiber enables recovery and replacement. The pumping of the at least one optical fiber may occur in a factory, controlled surface environment, or at the wellsite with the at least one optical fiber in the wellbore. The pumpable option may be used if one or two optical fibers are used. The pumpable option allows the at least one optical fiber to be recovered and replaced should it experience hydrogen darkening.

With the permanent option, at least one optical fiber is installed inside a capillary tubing in a factory or controlled environment. If a permanently installed optical fiber becomes damaged due to hydrogen darkening or thermal degradation, the recourse is a complete replacement. The permanent and pumpable options may strap or clamp the capillary tubing to the outside of casing, liners, and tubing, or installed inside a coiled tubing instrument tube.

With the temporary option, at least one optical fiber is run into a wellbore off a reeling system into the tubing or into a coiled tubing instrument tube. The coiled tubing instrument tube could be free hanging in the tubing-casing annulus or strapped to the tubing, casing, or liner. The temporary deployable optical fiber may use a small diameter FIMT (fiber in metal tube) with an outside diameter of 0.09 to 0.15 inches, which is reinforced with fiber glass, polyproylene, polyethylene, carbon fiber, or any combinations of the foregoing which encases and protects the FIMT. This temporary option is designed to be run in and out of many wellbores and installed for a few hours to a few weeks to acquire data.

Some installation options may depend on whether a wellbore is existing or new. In one embodiment, for an existing wellbore, installation may be inside the liner or casing on the tubing or coiled tubing to take advantage of the preexisting structure. However, for a newly drilled wellbore, installation may be either inside or outside the liner or casing with trade-offs between cost, risk, etc.

In short, those of ordinary skill in the art will appreciate that various installation options are available. In one embodiment, the capillary tubing may be attached to the outer surface of the tubing with a plurality of clamps, or any known method for coupling conduits. Further, in some embodiments, it should be appreciated that the capillary tubing need not be coupled to the tubing, but it may be coupled to any other conduits in the wellbore or the casing/liner itself, or it may be integral with the casing/liner, e.g., the capillary tubing may be positioned in the annulus, clamped/strapped/fastened to any of the tubing, inside the tubing, the liner, the casing, the instrument coiled tubing, or any combination thereof. Thus, the installation scheme that is chosen may depend upon whether the wellbore is new or preexisting, components of the wellbore, etc.

Returning to FIGS. 1A-1C, each of seismic sources 5a-5b may generate seismic excitations, such as one or more of seismic wave 10 in the water column 55. At least one fiber optic sensing apparatus configured for DAS, such as the FO cable 178, detects responses associated with the seismic excitations in the area of interest. In FIG. 1A, the FO cable 178 is on the seafloor 140. In FIG. 1B, the FO cable 178 is in the water column 55. In FIG. 1C, the FO cable 178 is in the water column 55 and in the wellbore 105 drilled through the seafloor 140 and into the subseafloor 101. The FO cable 178 may be previously installed at these locations and used as-is, or used with at least one modification. Alternatively, the FO cable 178 may be physically installed new at these locations. The FO cable 178 may be installed using a FO installation apparatus 179, for example, on the sea surface 50. One embodiment of the FO cable 178 comprises a capillary tubing 180. Expanded views of the capillary tubing 180, the FO cable 178, and the wellbore 105 are discussed at FIGS. 1D, 1E, 2A-1, 2A-2, 2B-1, 2B-2, 2C-1, 2C-2, 2D-1, 2D-2.

As illustrated in FIGS. 1A-1C, the FO cable 178 is coupled to an interrogator 75 on a sea surface vessel 51 on the sea surface 50. The interrogator 75 may be coupled in a wired manner to the FO cable 178. The FO cable 178 includes one or more DAS optical fibers within the FO cable 178.

DAS data 334 with the arrival times from the interrogator 75 may be sent to a computing system 300 for seismic processing, storage, determining a function of speed of sound in water to correct a digital seismic image associated with the area of interest, generating a corrected digital seismic image, etc. The interrogator 75 is coupled to the computing system 300 (discussed further below) wirelessly or in a wired manner. Although a single computing system 300 is illustrated on the sea surface vessel 51, the computing system 300 may represent at least one computing system in practically any location on the sea surface, on land, or any combination thereof. The computing system 300 may even be under the sea surface.

Those of ordinary skill in the art will appreciate that various modifications may be made to FIGS. 1A-1C, such as additional component(s) between the FO cable 178 and the interrogator 75, additional component(s) between the interrogator 75 and the computing system 300, etc. Another modification may be that the FO cable 178 is coupled to at least one interrogator under the sea surface (e.g., "marinized interrogator"), and an example is illustrated in FIGS. 1A-1C where each DAS receiver 182 (R(x,y,z)) may record at all source times t1, t2 . . . tn). The term "receiver" and "interrogator" are sometimes used interchangeably. Thus, some embodiments may use an interrogator on the sea surface only, some embodiments may use an interrogator under the sea surface only, or some embodiments may use a combination such that at least one interrogator is on the sea surface and at least one interrogator is under the sea surface. A plurality of FO cables may be used in some embodiments. A plurality of interrogators may be used in some embodiments. The functionality described in the context of the computing system 300 may also be split up amongst multiple components, such as multiple computing systems.

Figure 1D:
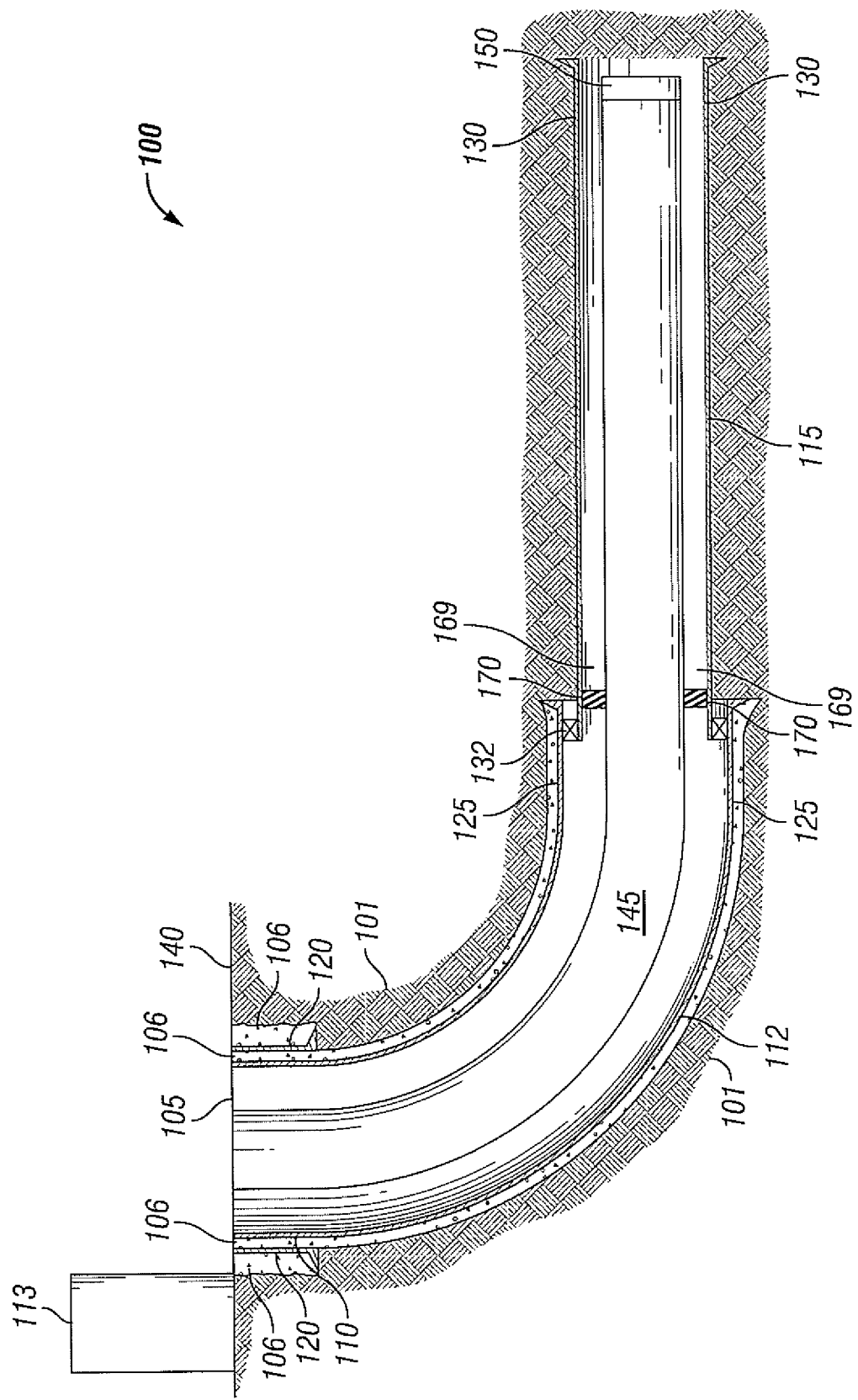
FIG. 1D is a cross-sectional view of one embodiment of a wellbore in FIG. 1C.

Wellbore: FIG. 1D illustrates an expanded view, in cross-section, of the wellbore 105 of FIG. 1C. The wellbore 105 is a horizontal wellbore. The wellbore 105 includes a vertical section 110, the build section 112, and a horizontal section 115. The area between the vertical section 110 and the horizontal section 115 is referred to as the heel and the area towards the end of the horizontal section 115 is referred to as the toe. For example, unconventional reservoirs may be produced using horizontal wellbores, such as the wellbore 105.

The wellbore 105 may be drilled with at least one drilling apparatus 113 through the seafloor 140 and into the subseafloor 101. The drilling apparatus 113 may include a drill bit, a drill string, etc. The drilling apparatus 113 may be utilized to drill at least one other wellbore based on the more accurate corrected digital seismic image generated with the embodiments herein. The wellbore 105 may be cemented as illustrated by cement 106. The wellbore 105 may include a surface casing 120 along a portion of the wellbore 105, a production casing 125 along a portion of the wellbore 105, and a liner 130 (e.g., a slotted liner) attached by at least one liner hanger 132. The wellbore 105 may also include a tubing 145 within the surface casing 120, the production casing 125, and the liner 130, which starts at the seafloor 65. The tubing 145 may be of standard sizes known in the industry (e.g., outermost diameter of 2⅜ inches to 4.5 inches) for standard and commonly known casing sizes (e.g., outermost diameter of 4½ inches to 12 inches), each of which have lengths in the tens to hundreds of feet. The tubing 145 includes a plurality of tubulars tubing joints, pup joints, packers (e.g., may include centralizers), etc. The end of the tubing 145 (e.g., at the toe) includes a bull plug 150. At least one packer 170 may be located in an annulus 169 between the tubing 145 and the liner 130.

In operation, the wellbore 105 may be utilized for hydrocarbon production, including waterflooding, etc. For example, water may enter the tubing 145, and the water is injected into the adjacent subseafloor 101 through flow control devices, perforations, etc. The hydrocarbons from the subseafloor 101 flow into the wellbore 105 and up towards the sea surface 50 via a riser (not shown) for refining, transporting, etc.

Those of ordinary skill in the art will appreciate that various modifications may be made to the wellbore 105. For example, the wellbore 105 may simply be a vertical wellbore, instead of a horizontal wellbore, in a different embodiment. Examples of vertical wellbores are provided in U.S. Patent Application Publication No. 2014/0288909 and U.S. Patent Application Publication No. 2017/0058186, each of which is incorporated by reference in its entirety. Furthermore, a plurality of wellbores, instead of the single wellbore 105 illustrated in FIG. 1C, may be drilled through the seafloor 140 and into the subseafloor 101.

Figure 1E:
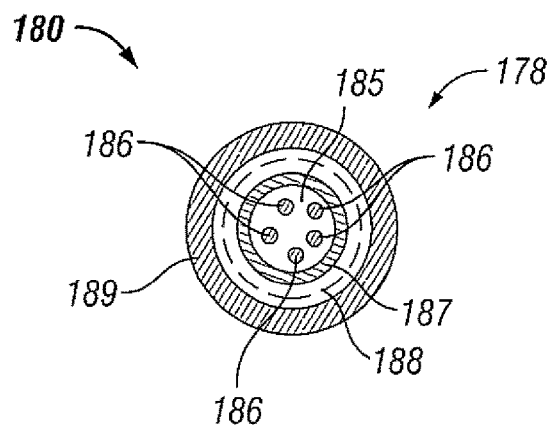
FIG. 1E is a cross-sectional view of one embodiment of a capillary tubing consistent with a fiber optic cable in FIGS. 1A-1C.

FO Cable—Capillary Tubing: FIG. 1E illustrates an expanded view, in cross-section, of the capillary tubing 180. The capillary tubing 180 is one embodiment of the FO cable 178, however, those of ordinary skill in the art will appreciate that there are other designs and the appended claims are not limited to any disclosed embodiments. The capillary tubing 180 may have a length of tens of feet to hundreds of feet. For example, the capillary tubing 180 may be practically the entire height of the water column 55, and optionally, a portion of the length or the entire length of the wellbore 105 per FIG. 1C. The outer diameter of the capillary tubing 180 may be about ⅛ inches to about ⅜ inches. The outer diameter of the capillary tubing 180 may be about ¼ inches. The dimensions of the capillary tubing 180 may vary as long as the responses to seismic excitations may be detected to generate DAS data 334.

Starting from the inside, the capillary tubing 180 includes a core 185 comprised of a first protective layer that is typically of an Inconel® or Incoloy® alloy 25, a stainless steel, or any combination thereof with at least one optical fiber 186 with at least one sensing portion inside the core 185. One or more of the optical fibers 186 is a DAS optical fiber, but other sensing capabilities, such as DPS, may be available in some embodiments. The optical fibers 186 may have high temperature coatings and coating combinations, including polyimide, high temperature acrylates, silicone-PFA, hermetic carbon, or any combination thereof to prevent hydrogen darkening. The core 185 may be filled with fluid, and the fluid surrounds each optical fiber 186. The fluid may be a gel or inert gas as discussed hereinabove. The inner diameter of the core 185 may be about 0.05 inches to about 0.10 inches. The combination of the first protective layer and the optical fiber(s) is commonly referred to as a FIMT or fiber in metal tube. The length of the core 185 depends on the length of the capillary tubing 180.

Adjacent to the core 185 may be an optional second protective layer 187, which may be of a metallic material such as aluminum. The diameter of the second protective layer 187 is optional, but may be about 0.10 inches to about 0.20 inches. The length of the second protective layer 187 depends on the length of the capillary tubing 180.

Adjacent to the optional second protective layer 187 may be a third protective layer 188, which may be of a metallic material (e.g., Inconel® or Incoloy® alloy 25, a stainless steel, or any combination thereof). The diameter of the third protective layer 188 may be about 0.20 inches to about 0.40 inches. The length of the third protective layer 188 depends on the length of the capillary tubing 180.

Adjacent to the third protective layer 188 may be an encapsulation protective layer 189, which is an extruded encapsulation polymer (e.g., polyethylene, polypropolyene, Teflon™ brand, Hypalon™ brand, or any combination thereof). The diameter of the encapsulation protective layer 189 may be about 0.25 inches to about 0.75 inches. The length of the encapsulation protective layer 189 depends on the length of the capillary tubing 180.

Figures 1, 2A:
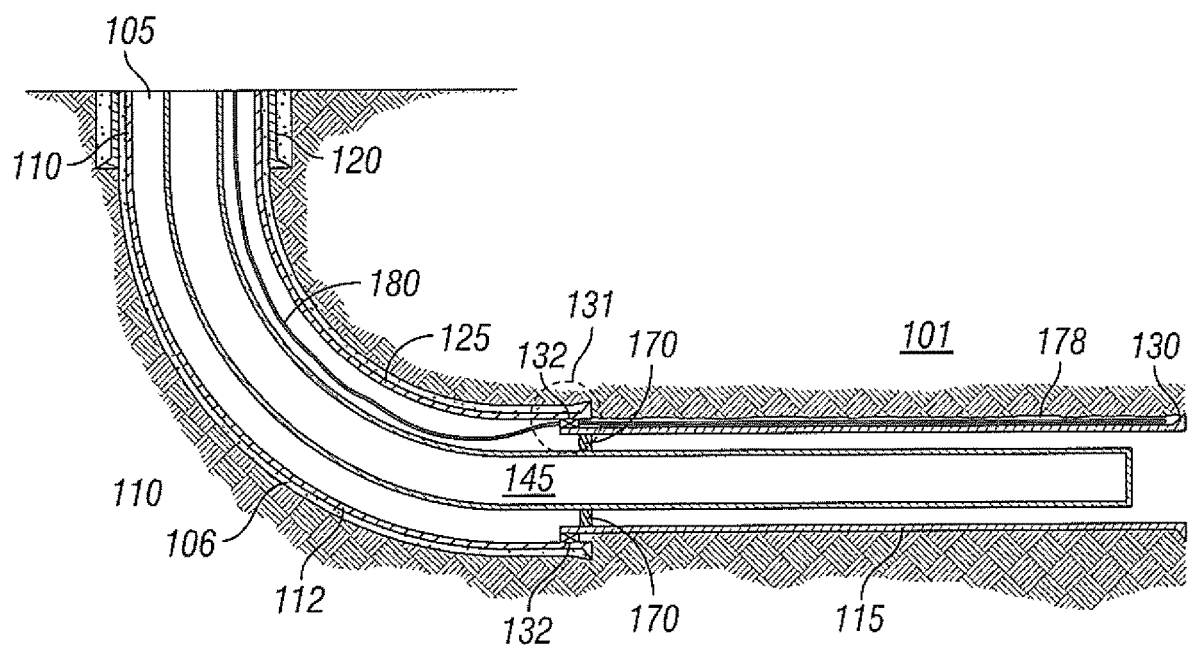
FIGS. 2A-1, 2A-2, 2B-1, 2B-2, 2C-1, 2C-2, 2D-1, and 2D-2 illustrate various capillary tubing installation schemes consistent with the fiber optic cable of FIGS. 1A-1C.
Figures 2, 2A:
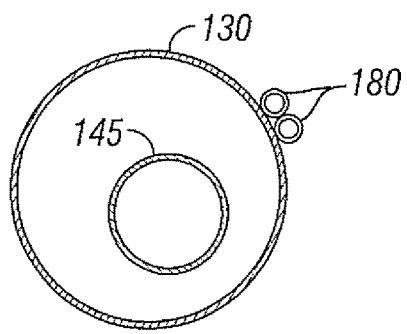

FO Cable—Capillary Tubing Clamped to Liner: FIGS. 2A-1 and 2A-2 illustrate an embodiment with a hydraulic wet connect at liner top 131 with the capillary tubing 180 being clamped to the tubing 145 above the liner top 131. There may be one or more of the capillary tubing 180. In the embodiment of FIGS. 2A-1 and 2A-2, the capillary tubing 180 may be installed outside of the liner 130 in the horizontal section 115 of the wellbore 105, and clamped on the tubing 145 in the vertical section 110. The optical fiber 186 of FIG. 1E (e.g., the DAS fiber, etc.) may be permanently installed in the capillary tubing 180 or can be pumped and retrieved through pumping to/from the capillary tubing 180. The hydraulic wet connect is used to connect the optical fiber 186 in the horizontal section 115 and the vertical clamped section 110. The tubing 145 can be run in and out of the wellbore without damaging the optical fiber 186 in the horizontal section 115. This setup may include at least one packer 170.

Figures 1, 2B:
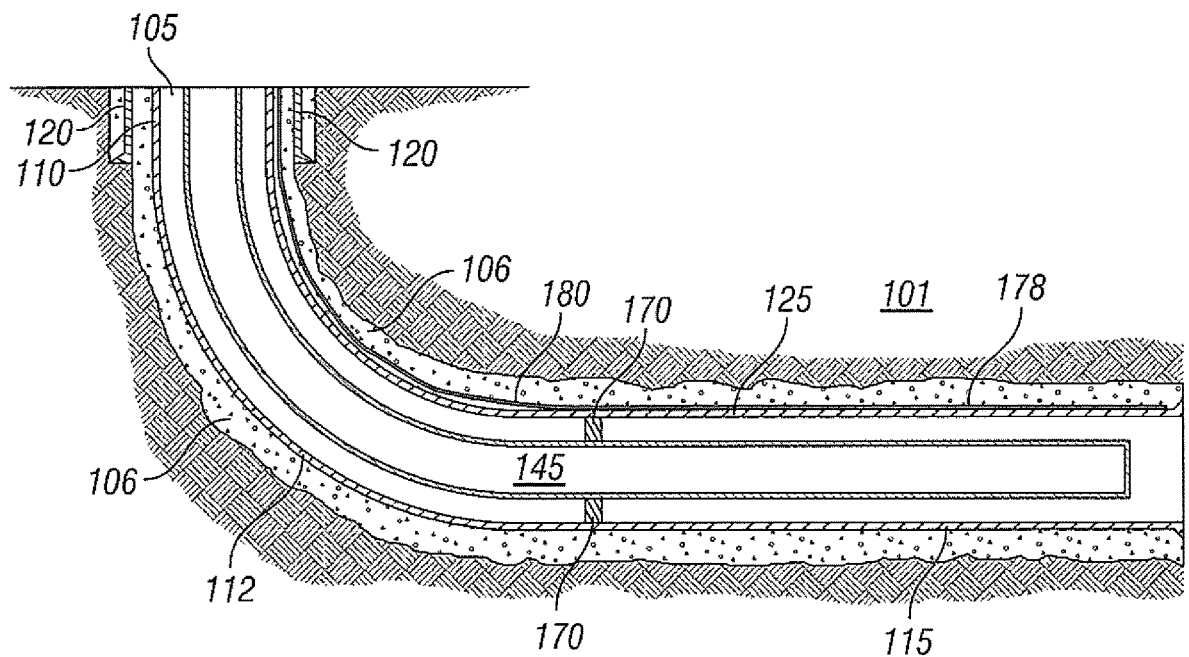
Figures 2, 2B:
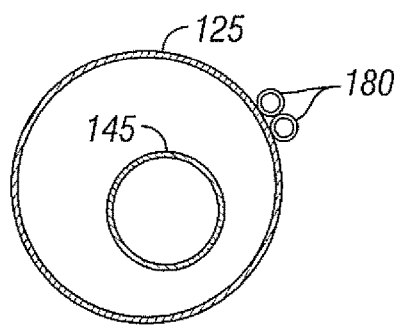

FO Cable—Capillary Tubing Clamped to Casing: FIGS. 2B-1 and 2B-2 illustrate an embodiment in which the capillary tubing 180 may be clamped to the casing, such as the production casing 125. There may be one or more of the capillary tubing 180. The installation scheme of FIGS. 2B-1 and 2B-2 is similar to the liner deployed surveillance scheme of FIGS. 2A-1 and 2A-2. As illustrated, the complete system is installed outside of the casing 125. The capillary tubing 180 is clamped to the casing 125 as the casing 125 is installed into the wellbore 105. The optical fiber 186 may be retrieved and replaced when designed with the pumpable option. In another embodiment, a single capillary tubing 180 may be run with single or multiple permanent optical fibers 186. The perforations may be shot 180 degrees away from the capillary tubing 180. The capillary tubing 180 may be run with ½ inch steel cables on either side of the ¼ inch capillary tubing 180 to facilitate electro-magnetic orienting of perforating guns. This setup may include at least one packer 170.

Figures 1, 2C:
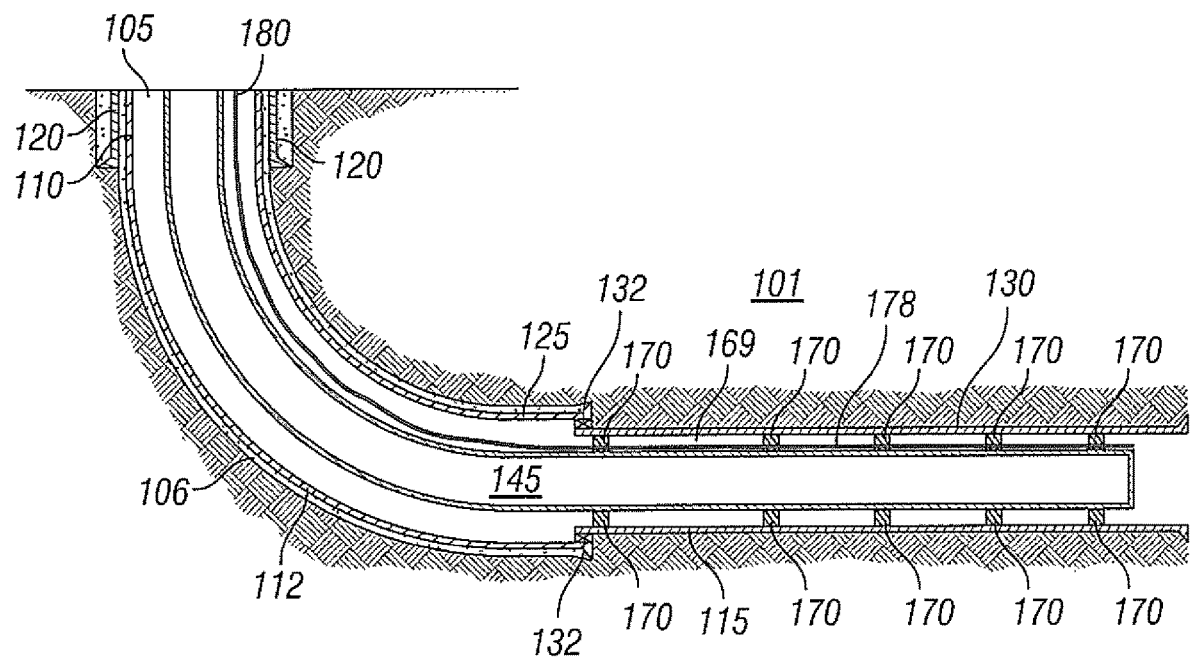
Figures 2, 2C:
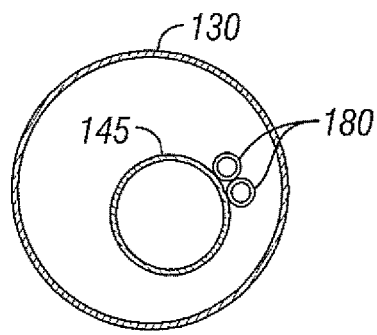

FO Cable—Capillary Tubing Clamped to Tubing: FIGS. 2C-1 and 2C-2 illustrate an embodiment in which the capillary tubing 180 may be clamped to the tubing 145. There may be one or more of the capillary tubing 180. In one embodiment of this scheme, the capillary tubing 180 is only clamped on the tubing 145 and no other component. In another embodiment, the capillary tubing 180 may be installed inside the tubing 145. The installation scheme in this setup is flexible, which facilitates the changes in the optical fiber 186 design and specifications. Additionally, the optical fiber 186 and capillary tubing 180 are retrievable. This setup may include at least one packer 170, and the capillary tubing 180 may penetrate through each packer 170.

Figures 1, 2D:
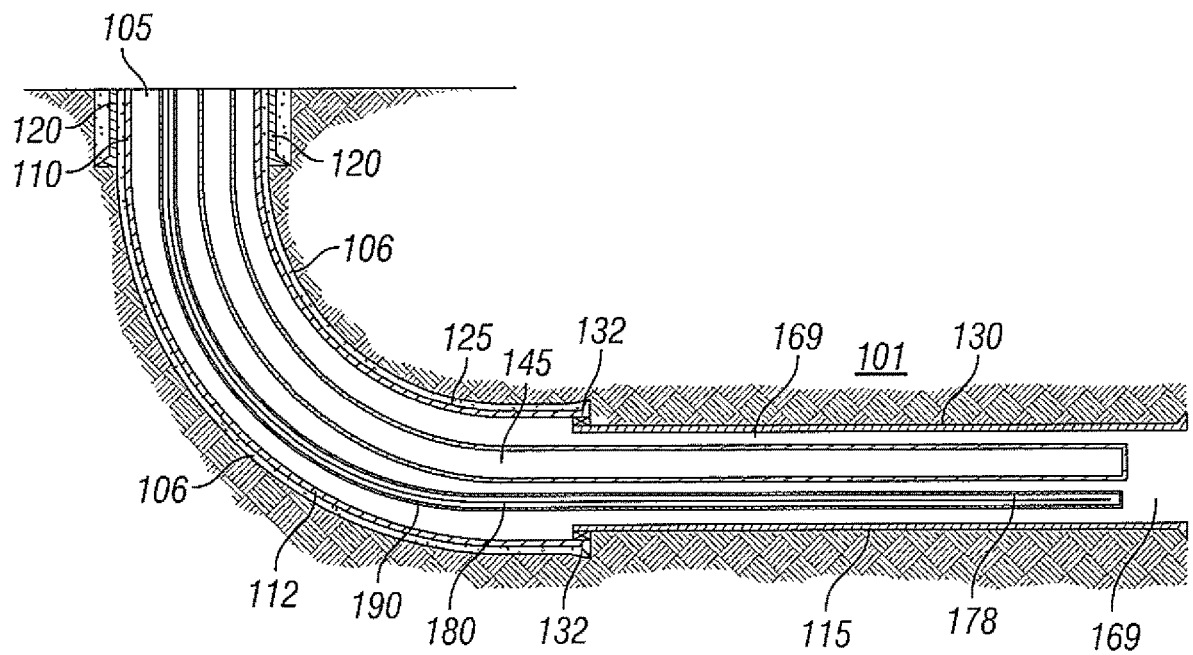
Figures 2, 2D:
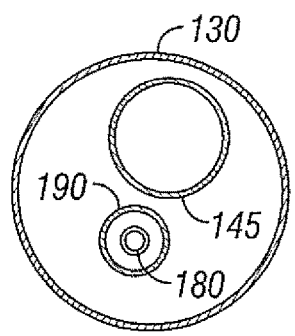

FO Cable—Capillary Tubing inside Instrument Coiled Tubing: FIGS. 2D-1 and 2D-2 illustrate an embodiment in which the capillary tubing 180 may be positioned within an instrument coiled tubing 190. There may be one or more of the capillary tubing 180. In one embodiment, the scheme of FIGS. 2D-1 and 2D-2 is used as a temporary surveillance method (e.g., for a few days) so there is less chance of fiber degradation and capillary tubing corrosion. In another embodiment, the scheme works best with a larger size of liner 130 or casing 125 to avoid damage to the optical fiber 186 and sticking in the wellbore 105. The scheme of FIGS. 2D-1 and 2D-2 is flexible, allowing retrieval of optical fiber 186/capillary tubing 180. This setup may not include any packers 170.

FIGS. 1A, 1B, 1C, 1D, 1E, 2A-1, 2A-2, 2B-1, 2B-2, 2C-1, 2C-2, 2D-1, and 2D-2 are not necessarily drawn to scale and those of ordinary skill will appreciate that various modifications may be made. For example, dimensions, materials, components, connectors, etc. may be based on compatibility with the conditions on and under the sea surface 50. Some modifications may also be found in U.S. Patent App. Pub. Nos. 2016/0281471, 2016/0281494, and 2016/0281456, each of which is incorporated by reference in its entirety. A discussion of fiber optics in a marine environment is provided in U.S. Patent App. Pub. No. 2018/0100939, which is incorporated by reference in its entirety. An additional discussion of fiber optics is provided in U.S. Patent App. Pub. No. 2018/0031734 and U.S. patent application Ser. No. 15/926,700 (T-10476), each of which is incorporated by reference in its entirety.

Figure 3:
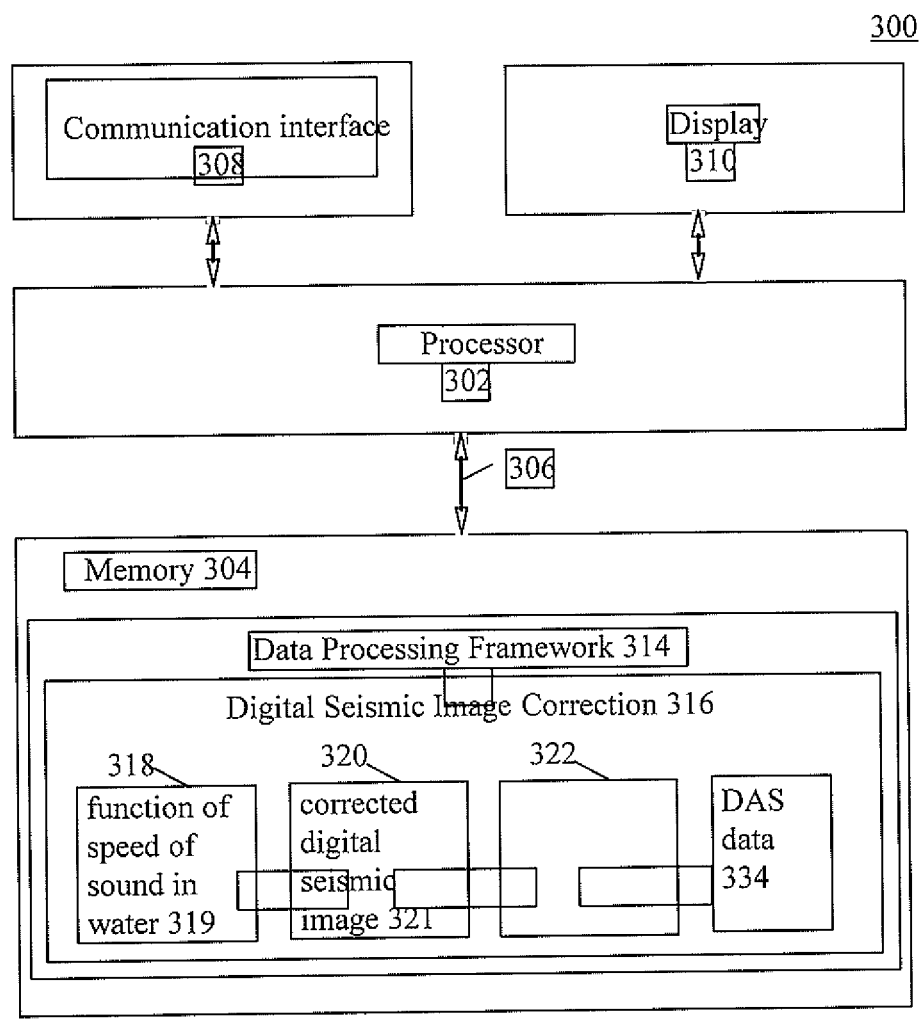
FIG. 3 illustrates one embodiment of a computing system for correcting a digital seismic image.

Computing System: FIG. 3 illustrates one embodiment of a computing system 300 for correcting a digital seismic image in accordance with the disclosure. The computing system 300 includes a processor 302 communicatively connected to a memory 304 via a data bus 306. The processor 302 may be any of a variety of types of programmable circuits capable of executing computer-readable instructions to perform various tasks, such as mathematical and communication tasks. The computing system 300 may comprise a computer, a smart phone, a tablet, a laptop, a desktop, a wireless device, a wired device, a network device, a plurality of networked devices, etc.

The memory 304 may include any of a variety of memory devices, such as using various types of computer readable or computer storage media. A computer storage medium or computer readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In example embodiments, the computer storage medium is embodied as a computer storage device, such as a memory or mass storage device. In particular embodiments, the computer-readable media and computer storage media of the present disclosure comprise at least some tangible devices, and in specific embodiments such computer-readable media and computer storage media include exclusively non-transitory media. In the embodiment shown, the memory 304 stores a data processing framework 314.

The computing system 300 can also include a communication interface 308 configured to receive data, such as the DAS data 335, which include arrival times from the FO cable 178. Other data may also be received via the communication interface 308. The communication interface 308 may also be configured to transmit data (e.g., transmit a function of speed of sound in water determined in accordance with the disclosure, a corrected digital seismic image generated in accordance with the disclosure, etc.), or other functionality. The computing system 300 may also be configured to transmit notifications as generated by a data processing framework 314 and also includes a display 310 for presenting a user interface associated with the data processing framework 314. For example, the data processing framework 314 may be utilized for generating a visual output that presents the function of speed of sound in water, the corrected digital seismic image, or any combination thereof for viewing by one or more users via the display 310. In various embodiments, the computing system 300 can include additional components, such as peripheral I/O devices, for example to allow a user to interact with the user interfaces generated by the data processing framework 314. In various embodiments, the computing system 300 may also allow for interaction with at least one other software item, at least one other hardware item, at least one other storage items, or any combination thereof (including those from third parties) to carry out functionality.

The data processing framework 314 of the embodiment includes a digital seismic image correction module 316 that executes a method of correcting a digital seismic image. As depicted, the digital seismic image correction module 316 includes: (1) a module 318 for determining a function of speed of sound in water (319) using the DAS data 334, (2) a module 320 for correcting a digital seismic image associated with the area of interest using the function of speed of sound in water to generate a corrected digital seismic image (321). The digital seismic image correction module 316 may also include a module 322 for seismic processing of the DAS data 334, such as deghosting, multiple removal, wavefield separation, receiver motion correction, spectral shaping, and the like.

Referring in particular to computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 300, above. Computer storage media does not include a carrier wave or other propagated or modulated data signal. In some embodiments, the computer storage media includes at least some tangible features; in many embodiments, the computer storage media includes entirely non-transitory components.

Digital Seismic Image Correction: Turning to FIG. 4, this figure is a flowchart that illustrates one embodiment of a method of correcting a digital seismic image, referred to as a method 400, in accordance with the disclosure. The method 400 may be executed by the computing system 300 of FIG. 3. Those of ordinary skill in the art will appreciate that various modifications may be made to the method 400. For example, those of ordinary skill in the art will appreciate that the inventive principles may be implemented using automated steps only in some embodiments.

At 405, the method 400 includes receiving DAS data for responses associated with seismic excitations in an area of interest. The area of interest includes a sea surface, a water column under the sea surface, a seafloor under the water column, and a subseafloor under the seafloor. The seismic excitations are generated by at least one seismic source in the area of interest. The responses are detected by at least one fiber optic sensing apparatus configured for DAS that is in the water column, on the seafloor, in a wellbore drilled through the seafloor and into the subseafloor, or any combination thereof. For example, the computing system 300 of FIG. 3 may receive the DAS data 334 from the interrogator 75 based on the responses detected by the FO cable 178 on the seafloor 80 (FIG. 1A), in the water column 55 (FIG. 1B), in the wellbore 105 (FIG. 1C), or any combination thereof. In some embodiments, the DAS data 334 may even be a subset of a larger set of DAS data.

At 410, the method 400 includes determining a function of speed of sound in water using the DAS data. The function of speed of sound in water may be determined during processing of the DAS data. Alternatively, the DAS data may be at least partially processed before determining the function of speed of sound in water. In some embodiments, determining the function of speed of sound in water includes deriving a $Vw(z)$ function, a $Vwaverage(t)$ function, a $Vw(z,t)$ function, a $Vw(x,y,z,t)$ function, or any combination thereof. At least one function may be determined at 410. Of note, $(x,y,z)$ are three-dimensional space variables, $(t)$ is a time variable, $Vw$ represents speed of sound in water, and $Zw$ represents depth of water. For example, the computing system 300 may be used to determine a function of the speed of sound in water using the DAS data 334.

In some embodiments, the function of speed of sound in water may be determined using tomographic inversion. Tomographic inversion comprises iterative comparison and update of an initial model with the DAS data. The image converges as the cost function reduces to minimum. Thus, at 410, data received from sensors (e.g. DAS data) is used to solve the location of reflections, diffractors, and refractions by inversion, as described in R. G. Pratt, Z. M. Song, M. R. Warner and P. R. Williamson: 56th EAEG Meeting; Velocity models from wide-angle seismic data by wavefield inversion, which is incorporated by reference in its entirety.

In some embodiments, the function of speed of sound in water may be determined using interferometry. For example, interferometry comprises cross correlation or convolution, as well as stacking of DAS data to approximate pseudo sources at each DAS receiver for velocity profiling and imaging of media through which the seismic wavefield has passed. Thus, at 410, this item may include cross correlation of pairs of seismic signals and making use of interference to reconstruct the impulse response of the propagation media, as described in Claerbout, Jon F. (April 1968). "SYNTHESIS OF A LAYERED MEDIUM FROM ITS ACOUSTIC TRANSMISSION RESPONSE". Geophysics. 33 (2): 264-269, which is incorporated by reference in its entirety.

At 415, the method 400 includes correcting a digital seismic image associated with the area of interest using the function of speed of sound in water to generate a corrected digital seismic image. The digital seismic image may be a one-dimensional (1D) image, a two-dimensional (2D) image, a three-dimensional (3D) image, or a four-dimensional (4D) image (also referred to as a time-lapsed image). For example, the computing system 300 may be used to correct a digital seismic image to generate the corrected digital seismic image 321.

In some embodiments, correcting the digital seismic image includes using the changes in height of the water column. For example, the FO cable 178 may be further configured for DPS for determining changes in height of the water column 55. Determining water column height from DPS includes using the following equation:

$$P = \rho g h$$

where P represents pressure at sensing point, $\rho$ represents fluid density, g represents acceleration of gravity, and h represents height of fluid above pressure sensing point.

As an example, at 415, seismic travel time variation may be corrected due to dynamic speed of sound in water $Vw(x,y,z,t)$ and variation in height of the water column $Zw(t)$.

At 420, the method 400 includes generating a visual output that presents the function of speed of sound in water, the corrected digital seismic image, or any combination thereof for viewing by one or more users. For example, the computing system 300 may be used to generate a visual output that presents the function of speed of sound in water 319, the corrected digital seismic image 321, or any combination thereof.

Turning to FIG. 5, this figure illustrates a flowchart that illustrates another embodiment of a method of correcting a digital seismic image, referred to as a method 500, in accordance with the disclosure. Those of ordinary skill in the art will appreciate that various modifications may be made to the method 500. For example, the method 500 may be implemented using a combination of automated steps and manual steps.

At 505, the method includes using at least one seismic source in an area of interest to generate seismic excitations in the area of interest. The area of interest includes a sea surface, a water column under the sea surface, a seafloor under the water column, and a subseafloor under the seafloor. At 510, the method includes, optionally, installing the at least one seismic source in the area of interest. For example, the seismic source 5a-5b may be used, and they may be previously installed or newly installed using the seismic source installation apparatus 6. The seismic source 5a-5b may be active, passive, or any combination thereof.

At 515, the method includes using at least one fiber optic sensing apparatus configured for distributed acoustic sensing that is in the water column, on the seafloor, in a wellbore drilled through the seafloor and into the subseafloor, or any combination thereof to detect responses associated with the seismic excitations. At 520, the method includes, optionally, installing the at least one fiber optic sensing apparatus configured for distributed acoustic sensing in the water column, on the seafloor, in the wellbore drilled through the seafloor and into the subseafloor, or any combination thereof. For example, the FO cable 178 may be used, and it may be previously installed or newly installed using the FO installation apparatus 179.

In method 500, step 525 is similar to step 405 of FIG. 4. Step 530 is similar to step 410 of FIG. 4. Step 535 is similar to step 415 of FIG. 4. Step 540 is similar to step 420 of FIG. 4.

Figure 6:
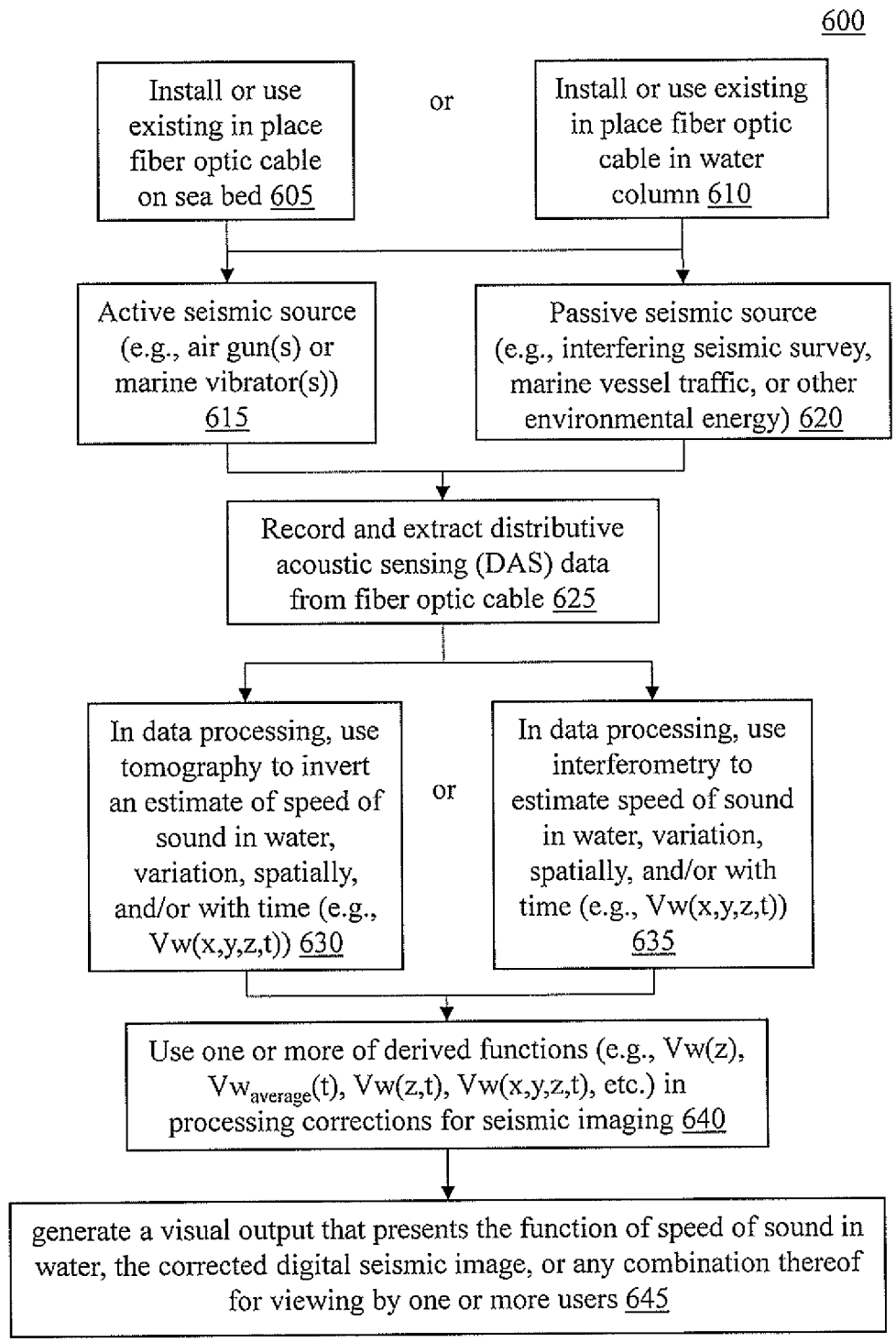
FIG. 6 is a flowchart that illustrates another embodiment of a method of correcting a digital seismic image.

Turning to FIG. 6, this figure illustrates a flowchart that illustrates another embodiment of a method of correcting a digital seismic image, referred to as a method 600, in accordance with the disclosure. Those of ordinary skill in the art will appreciate that various modifications may be made to the method 600. For example, the method 600 may be implemented using a combination of automated steps and manual steps.

In method 600, steps 605-610 are similar to steps 515-520 of FIG. 5. Steps 615-620 are similar to steps 505-510 of FIG. 5. At 625, the method 600 includes recording and extracting DAS data from the FO cable. For example, recording and extracting the DAS data 334 from the FO cable 178 may include using the interrogator 75. This step may also include sending the DAS data 334 to the computing system 300. Steps 630-635 are similar to step 410 of FIG. 4. Step 640 is similar to step 415 of FIG. 4. Step 645 is similar to step 420 of FIG. 4.

Those of ordinary skill in the art will appreciate that various modifications may be made to the embodiments provided herein. Furthermore, embodiments of the present disclosure can be implemented as a computing system, a computer process (method), an article of manufacture (e.g., computer readable medium or computer storage medium), a process (method), a system (e.g., a seismic surveillance system, a combination of a seismic surveillance system and a computing system, etc.), etc.

The description and illustration of embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

Moreover, while the invention has been described with reference to various embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It is to be expressly understood, however, that each of the figures is provided for the purpose of illustration and description only and is not intended to limit the present invention.

The invention claimed is:

1. A method of correcting a digital seismic image, the method comprising:
receiving distributed acoustic sensing data of responses associated with seismic excitations in an area of interest, wherein the area of interest includes a sea surface, a water column under the sea surface, a seafloor under the water column, and a subseafloor under the seafloor, wherein the seismic excitations are generated by at least one seismic source in the area of interest, and wherein said responses are detected by at least one fiber optic sensing apparatus configured for distributed acoustic sensing that is at least in the water column;
determining a function of speed of sound in water using the distributed acoustic sensing data; and
correcting a digital seismic image associated with the area of interest using the function of speed of sound in water to generate a corrected digital seismic image,
wherein determining the function of speed of sound in water includes deriving a Vw(z) function, a Vw(z,t) function, a Vw(x,y,z,t) function, or any combination thereof, wherein (x,y,z) are three-dimensional space variables, (t) is a time variable, and Vw represents speed of sound in water.

2. The method of claim 1, wherein the fiber optic sensing apparatus is further configured for distributed pressure sensing for determining changes in height of the water column, and wherein correcting the digital seismic image includes using the changes in height of the water column.

3. The method of claim 1, wherein the at least one fiber optic sensing apparatus comprises a fiber optic cable.

4. The method of claim 1, wherein the at least one fiber optic sensing apparatus comprises a fiber optic sensor.

5. The method of claim 1, wherein the digital seismic image is a one-dimensional (1D) image, a two-dimensional (2D) image, a three-dimensional (3D) image, or a four-dimensional (4D) image.

6. The method of claim 1, wherein the function of speed of sound in water is determined during processing of the distributed acoustic sensing data.

7. The method of claim 1, wherein the distributed acoustic sensing data is at least partially processed before determining the function of speed of sound in water.

8. The method of claim 1, wherein the function of speed of sound in water is determined using tomographic inversion.

9. The method of claim 1, wherein the function of speed of sound in water is determined using interferometry.

10. The method of claim 1, further comprising deriving a function Zw(x,y,t), wherein Zw represents depth of water.

11. The method of claim 1, further comprising generating a visual output that presents the function of speed of sound in water, the corrected digital seismic image, or any combination thereof for viewing by one or more users.

12. A system, the system comprising:
a processor; and
a memory operatively connected to the processor, the memory storing instructions that, when executed by the processor, cause the processor to a method of correcting a digital seismic image, the method comprising:
receiving distributed acoustic sensing data of responses associated with seismic excitations in an area of interest, wherein the area of interest includes a sea surface, a water column under the sea surface, a seafloor under the water column, and a subseafloor under the seafloor, wherein the seismic excitations are generated by at least one seismic source in the area of interest, and wherein said responses are detected by at least one fiber optic sensing apparatus configured for distributed acoustic sensing that is at least in the water column;
determining a function of speed of sound in water using the distributed acoustic sensing data; and
correcting a digital seismic image associated with the area of interest using the function of speed of sound in water to generate a corrected digital seismic image,
wherein determining the function of speed of sound in water includes deriving a Vw(z) function, a Vw(z,t) function, a Vw(x,y,z,t) function, or any combination thereof, wherein (x,y,z) are three-dimensional space variables, (t) is a time variable, and Vw represents speed of sound in water.

13. The system of claim 12, wherein the fiber optic sensing apparatus is further configured for distributed pressure sensing for determining changes in height of the water column, and wherein correcting the digital seismic image includes using the changes in height of the water column.

14. The system of claim 12, wherein the at least one fiber optic sensing apparatus comprises a fiber optic cable.

15. The system of claim 12, wherein the at least one fiber optic sensing apparatus comprises a fiber optic sensor.

16. The system of claim 12, wherein the digital seismic image is a one-dimensional (1D) image, a two-dimensional (2D) image, a three-dimensional (3D) image, or a four-dimensional (4D) image.

17. The system of claim 12, wherein the function of speed of sound in water is determined during processing of the distributed acoustic sensing data.

18. The system of claim 12, wherein the distributed acoustic sensing data is at least partially processed before determining the function of speed of sound in water.

19. The system of claim 12, wherein the function of speed of sound in water is determined using tomographic inversion.

20. The system of claim 12, wherein the function of speed of sound in water is determined using interferometry.

21. The system of claim 12, further comprising deriving a function Zw(x,y,t), wherein Zw represents depth of water.

22. The system of claim 12, wherein the memory stores instructions that, when executed by the processor, cause the processor to generate a visual output that presents the function of speed of sound in water, the corrected digital seismic image, or any combination thereof for viewing by one or more users.

23. The method of claim 1, further comprising:
using at least one seismic source in the area of interest to generate seismic excitations in the area of interest, wherein said detected responses comprise responses associated with the seismic excitations.

24. The method of claim 23, further comprising installing the at least one seismic source in the area of interest.

25. The method of claim 23, further comprising installing the at least one fiber optic sensing apparatus at least in the water column, and optionally also on the seafloor and/or in the wellbore drilled through the seafloor and into the subseafloor.

26. The method of claim 1, wherein the at least one fiber optic sensing apparatus is further on the seafloor and/or in a wellbore drilled through the seafloor and into the subseafloor.

27. The system of claim 12, wherein the at least one fiber optic sensing apparatus is further on the seafloor and/or in a wellbore drilled through the seafloor and into the subseafloor.

28. The system of claim 12, further comprising the at least one seismic source in the area of interest.

29. The system of claim 12, further comprising the at least one fiber optic sensing apparatus at least in the water column, and optionally also on the seafloor and/or in the wellbore drilled through the seafloor and into the subseafloor.

* * * * *